United States Patent
Tominaga

Patent Number: 6,086,513
Date of Patent: Jul. 11, 2000

[54] CONTROL DEVICE FOR HYDRAULIC SYSTEM OF A CONTINUOUSLY VARIABLE TRANSMISSION

[75] Inventor: Masakazu Tominaga, Kanagawa, Japan

[73] Assignee: Nissan Motor Co., Ltd., Yokohama, Japan

[21] Appl. No.: 08/927,271

[22] Filed: Sep. 11, 1997

[30] Foreign Application Priority Data

Sep. 13, 1996 [JP] Japan .................................... 8-243407

[51] Int. Cl.$^7$ ................................................... B60K 41/02
[52] U.S. Cl. .......................................... 477/169; 477/175
[58] Field of Search .................................. 477/166, 169, 477/175

[56] References Cited

U.S. PATENT DOCUMENTS

| | | | |
|---|---|---|---|
| 4,623,053 | 11/1986 | Nishikawa | 477/169 |
| 5,607,373 | 3/1997 | Ochiai et al. | 477/46 |
| 5,637,053 | 6/1997 | Droste et al. | 477/169 X |
| 5,667,458 | 9/1997 | Narita et al. | 477/169 |
| 5,697,866 | 12/1997 | Okahara | 477/169 |
| 5,782,718 | 7/1998 | Wakahara | 477/169 X |

FOREIGN PATENT DOCUMENTS 7-259941 10/1995 Japan .

*Primary Examiner*—Charles A Marmor
*Assistant Examiner*—Scott Lund
*Attorney, Agent, or Firm*—Foley & Lardner

[57] ABSTRACT

In a fluid pressure control system for a continuously variable transmission, a valve for regulating a torque converter pressure is a pilot actuated valve having a pressure increasing side pilot port for receiving a control pilot pressure for controlling a line pressure and a pressure decreasing side pilot port for receiving a second pilot pressure. A selector valve is switched between a first state for allowing the supply of the second pilot pressure to decrease the torque converter pressure supplied to the torque converter and a second state for draining the second pilot pressure to increase the torque converter pressure. By controlling the selector valve, a control unit increases the torque converter pressure in a wide throttle high speed vehicle operation with the torque converter in a lockup state to ensure the lockup engagement and in a wide throttle starting operation with the torque converter in a non-lockup state to prevent an engine stall. Otherwise, the control system decreases the torque converter pressure to improve the fuel economy.

15 Claims, 16 Drawing Sheets

| LOCKUP CONTROL PRESSURE | TORQUE CONVERTER PRESSURE INCREASING SIDE SELECTOR VALVE | TORQUE CONVERTER PRESSURE DECREASING SIDE SELECTOR VALVE |
|---|---|---|
| 0 ~ PL/USOL1 | OPEN | OPEN |
| PL/USOL1 ~ PL/USOL2 | CLOSED | OPEN |
| PL/USOL2 ~ | CLOSED | CLOSED |

CONTROL DEVICE FOR HYDRAULIC SYSTEM OF A CONTINUOUSLY VARIABLE TRANSMISSION

The contents of a Japanese Patent Application No. 8-243407 filed on Sep. 13, 1996 in Japan are hereby incorporated by reference.

BACKGROUND OF THE INVENTION

The present invention relates to a continuously variable transmission system mounted on a vehicle, and more specifically to a belt type continuously variable transmission system for continuously varying a reduction ratio by varying groove widths of pulleys drivingly connected by a belt.

A continuously variable transmission (CVT) system generally includes a CVT mechanism, a forward/reverse changeover mechanism for reversing the rotational direction with friction devices such as clutch and brake, a torque converter between an engine and the CVT mechanism, and a hydraulic fluid pressure control system.

FIG. 16 schematically illustrates a conventional example as disclosed in a Japanese Patent Provisional Publication No. 7(1995)-259941 in a somewhat simplified form. A similar CVT system is disclosed in a U.S. Pat. No. 5,607,373.

The CVT system of FIG. 16 has a series combination of a pump 1 directly connected with a rotation drive system, a line pressure regulating valve 2, a clutch pressure regulating valve 3 and a torque converter pressure regulating valve 4. A lubricating system 9 is connected on the downstream side of the torque converter pressure regulating valve 4. On the upstream side of each regulating valve, a corresponding one of CVT mechanism 6, forward/reverse changeover mechanism 7 and torque converter 8 is connected by a branch line. Line pressure regulating means 2a supplies a control pressure to a pressure increasing side of the line pressure regulating valve 2. Clutch pressure regulating means 3a supplies a control pressure to a pressure increasing side of the clutch pressure regulating valve 3. A lockup control valve 5 is disposed between the upstream side of the torque converter pressure regulating valve 4 and the torque converter 8. Lockup regulating means 5a supplies a control pressure to the lockup control valve 5. The lockup control valve 5 has first and second outlet ports connected, respectively, to release and apply sides of the torque converter 8 to put the torque converter 8 in a non-lockup state for a hydrodynamic drive and in a lockup state for a direct mechanical drive.

Through upstream port and pressure decreasing side pilot port, the line pressure regulating valve 2 receives the operating fluid under pressure from the pump 1, and regulates the pressure until a hydraulic balance is reached between the spool thrust by a return spring and the pressure increasing side control pressure from the line pressure regulating means 2a and the spool thrust by the pressure decreasing side pilot pressure, to produce the line pressure on the upstream side of the upstream port. This line pressure is supplied to the CVT mechanism 6, specifically to a pulley cylinder chamber. The control pressure from the line pressure regulating means 2a is adjusted so as to prevent slippage of the belt while attaining a target reduction ratio. Therefore, the line pressure supplied to the CVT mechanism 6 is regulated in accordance with an input load on the CVT mechanism 6 such as the engine output (torque) and the reduction ratio of the pulleys.

The remainder of the fluid under pressure reduced by the line pressure regulating valve 2 is supplied to the upstream port and pressure decreasing side pilot port of the clutch pressure regulating valve 3. The clutch pressure regulating valve 3 produces the clutch pressure by regulating the fluid pressure until a balance is reached between the thrust by the return spring and the pressure increasing side control pressure from the clutch pressure regulating means 3a and the thrust by the pressure decreasing side pilot pressure; and supplies the clutch pressure to the forward/reverse changeover mechanism 7. In the system of the above-mentioned Japanese publication, the control pressure of the clutch pressure regulating means 3a is controlled minutely to prevent the creep. However, such a minute control is not required when the system employs the torque converter 8 as mentioned later. To facilitate understanding, therefore, it is possible to consider that the control pressure is adjusted only to meet the demand of each friction device in the forward/reverse changeover mechanism 7.

The remainder of the fluid after the clutch pressure regulating valve 3 is supplied to the upstream port and pressure decreasing side pilot port of the torque converter pressure regulating valve 4. The converter pressure regulating valve 4 produces the torque converter pressure by reducing the fluid pressure until a balance is reached between the thrust by the return spring and the thrust by the pressure decreasing side pilot pressure; and supplies the thus-produced torque converter pressure to the torque converter 8. The remaining fluid is supplied to the lubricating system 9.

The torque converter pressure is supplied from the converter pressure regulating valve 4 through the lockup control valve 5 to the torque converter 8. When the control pressure is not supplied from the lockup regulating means 5a, the lockup control valve 5 supplies the torque converter pressure to the release side and puts the torque converter in the non-lockup state. When the control pressure is supplied from the lockup regulating means 5a, the lockup control valve 5 is held in the position to supply the torque converter pressure to the apply side, and puts the torque converter 8 in the lockup state. The lockup regulating means 5a controls its control pressure mainly in accordance with the vehicle speed and the engine speed. In changing the torque converter from the non-lockup state to the lockup state, the conventional system disclosed in the above-mentioned Japanese publication is arranged to vary the control pressure of the lockup regulating means 5a gradually in accordance with a deviation between the input speed (equivalent to the engine speed) and the output speed (equivalent to the vehicle speed), that is, a deviation between an impeller speed and a turbine speed of the torque converter. The illustrated example shown in FIG. 16 is simplified to facilitate understanding so that the control pressure of the lockup regulating means 5a is an on/off signal to simply alternating between the lockup state and the non-lockup state.

In this pressure control circuit, the fluid from the pump 1 is supplied sequentially to the components in order of required pressure level, so that one component passes the fluid to the next component of lower required pressure level. Such a circuit is efficient and advantageous in flow balance, as compared to a pressure control circuit for an ordinary automatic transmission in which the line pressure is reduced sequentially with restrictions. Specifically in the belt type CVT control system configured to control the fluid pressure supplied to the pulleys in a wide range (with a gain of a considerable magnitude) so as to grip the belt with the pulleys and to vary the groove widths of the pulleys in accordance with the input load to the CVT mechanism, the pressure control circuit of the type shown in FIG. 16 is advantageous because of its capability of readily producing the required pressures for the pulleys and other components. The use of the torque converter may eliminate the necessity of the clutch pressure regulating valve in some cases.

In the conventional system, the torque converter pressure regulating valve is arranged to regulate the torque converter pressure at a constant pressure level. The torque converter pressure is set at the constant pressure level which is below a withstanding pressure defined by a mechanical limit of the torque converter, but which is high enough to secure the lockup state of the torque converter without slippage even in a high output high speed vehicle operation in which the engine is producing a great output and the vehicle speed is high. The conventional system holds the torque converter pressure at the constant level even in a start accelerating operation in which the torque converter is in a non-lockup state, and the difference between the input and output speeds (the impeller speed and turbine speed) of the torque converter increases widely. In the non-lockup state, the torque converter pressure supplied to the release side is drained from the apply side through the clearance between the lockup facing member and the torque converter cover, so that the pressure difference between the release and apply sides is small.

In the above-mentioned high output starting operation (stall start operation), the engine speed is high with deep depression of the accelerator pedal, but the turbine speed equivalent to the wheel speed is still very low. In this state, the narrow pressure difference between the release and apply sides cannot produce a sufficient flow of the fluid between the lockup facing member and the converter cover. Therefore, the clearance therebetween is reduced, and the lockup facing member connected with the turbine (and the wheels) tends to drag the torque converter cover rotating at a high speed with the engine, and to reduce the stability of the engine rotation. In the system controlling the line pressure in accordance with the input load to the CVT mechanism, increasing the line pressure in the non-lockup state and decreasing the line pressure in the lockup state, it is possible to avoid the drag of the lockup member by normally decreasing the line pressure with a restriction and increasing the line pressure in the non-lockup state. In the belt CVT system requiring a large gain control of the line pressure for the pulleys, the arrangement of the restriction cannot fulfil the requirements for the torque converter pressure.

The pressure regulating valves have a construction as shown in FIG. 17A. In the valve of FIG. 17A, a return spring pushes a spool leftwards, and the fluid from an upstream port flows through a groove formed between left and right lands of the spool, to a downstream port. A pilot pressure acts on a pressure receiving are of the left end of the spool. In this type of a pressure reducing valve, an increase in the supply fluid flow causes an increase in displacement of the spool and hence an increase in reaction force of the return spring. As the supply flow Q increases, therefore, the regulated pressure P1 on the upstream side increases beyond a preset pressure level as shown in FIG. 17B. This phenomenon is known as override. The torque converter pressure is set at the relatively high level to ensure the lockup state, and accordingly, the torque converter pressure does not differ so much from the clutch pressure on the upstream side of the clutch pressure regulating valve 3. In the clutch pressure regulating valve, therefore, the little difference between the torque converter pressure on the downstream side and the clutch pressure on the upstream side increases the difficulty in fluid flow between the upstream and downstream sides, and increases the undesired override by increasing the displacement of the spool. Furthermore, the increase in the clutch pressure reduces the pressure difference between the upstream and downstream sides of the line pressure regulating valve 2. This small pressure difference increases the override of the valve 2, and increases the upstream pressure of the valve 2, that is, the downstream pressure of the pump 1. The increase in the pump discharge pressure means an increase of the load on the pump and an increase of the load on the engine for driving the pump, eventually resulting in deterioration in fuel consumption. A decrease of the preset level for the torque converter pressure may avoid this problem by increasing the difference from the clutch pressure. However, the low torque converter pressure cannot ensure the lockup state in the high output high speed operation.

SUMMARY OF THE INVENTION

It is therefore an object of the present invention to provide a continuously variable transmission system which can prevent drag of a lockup member in the stall start operation, improve the fuel economy by restraining the override toward the pump, and secure the lockup state in the high output high speed operation.

A control system according to the present invention comprises a lockup torque converter; a continuously variable transmission mechanism comprising a driver pulley, a follower pulley and a belt connecting the pulleys; a fluid pump; a first pressure regulating valve for receiving a fluid under pressure from the pump, producing a first regulated fluid pressure (line pressure) depending on an input load on the transmission mechanism and supplying the first regulated fluid pressure to the transmission mechanism; and a second pressure regulating valve for receiving the fluid from the first pressure regulating valve and supplying a second regulated fluid pressure (torque converter pressure) to the torque converter.

According to one aspect of the invention, the control system further comprises lockup monitoring means for monitoring a lockup indicative operating parameter (such as a CVT input torque, an engine torque, a lockup control electric signal, a modifier control pressure, a lockup control pressure or a line pressure) indicative of a lockup state of the torque converter to determine whether the torque converter is in the lockup state; and converter pressure adjusting means for adjusting the second regulated fluid pressure in a first regulating mode when the torque converter is in the lockup state, and in a second regulating mode when the torque converter is out of the lockup state.

This control system can selectively increase the second regulated (torque converter) pressure to a higher level with the adjusting means to prevent the drag in the stall start operation. In this case, the substantial pressure which the torque converter in the non-lockup state bears is intermediate between the release side pressure and the apply side pressure. Therefore, the control system can readily prevent mechanical damage of the torque converter by setting the higher level of the second regulated pressure appropriately. In the lockup state, the control system can reduce the overdrive of each regulating valve and thereby reduce the load on the fluid pump to the advantage of fuel economy by decreasing the second regulated pressure to a lower level suitable to the vehicle operating condition with the adjusting means.

The control system can be configured to discriminate a high output high speed vehicle operation, and to secure the lockup state by increasing the second regulated pressure with the adjusting means in the high output high speed operation. Moreover, the control system can be configured to discriminate a stall start operation, and to decrease the second regulated pressure to reduce energy loss and load on the pump in the state in which the torque converter is not locked up, and the vehicle is not in the stall start operation.

According to another aspect of the invention, the second pressure regulating valve is arranged to receive a second regulator control pressure ,(such as PL-SOL) in a direction increasing the second regulated pressure. In this case, the control system can increase the second regulated pressure by increasing the second regulator control pressure in accordance with the input load to the CVT mechanism, and thereby prevent the drag in the stall start operation. In the lockup state, the control system can reduce the override by decreasing the second regulated pressure with the second regulator control pressure decreased in accordance with the input load to the CVT mechanism. In the high output high speed operating state, the control system can secure the lockup state by increasing the second regulated pressure to a higher level. This higher pressure level need not be so high as the higher level in the stall start operation. The second pressure regulating valve of this type is advantageous in manufacturing cost and layout.

DETAILED DESCRIPTION OF THE INVENTION

Figure 1:
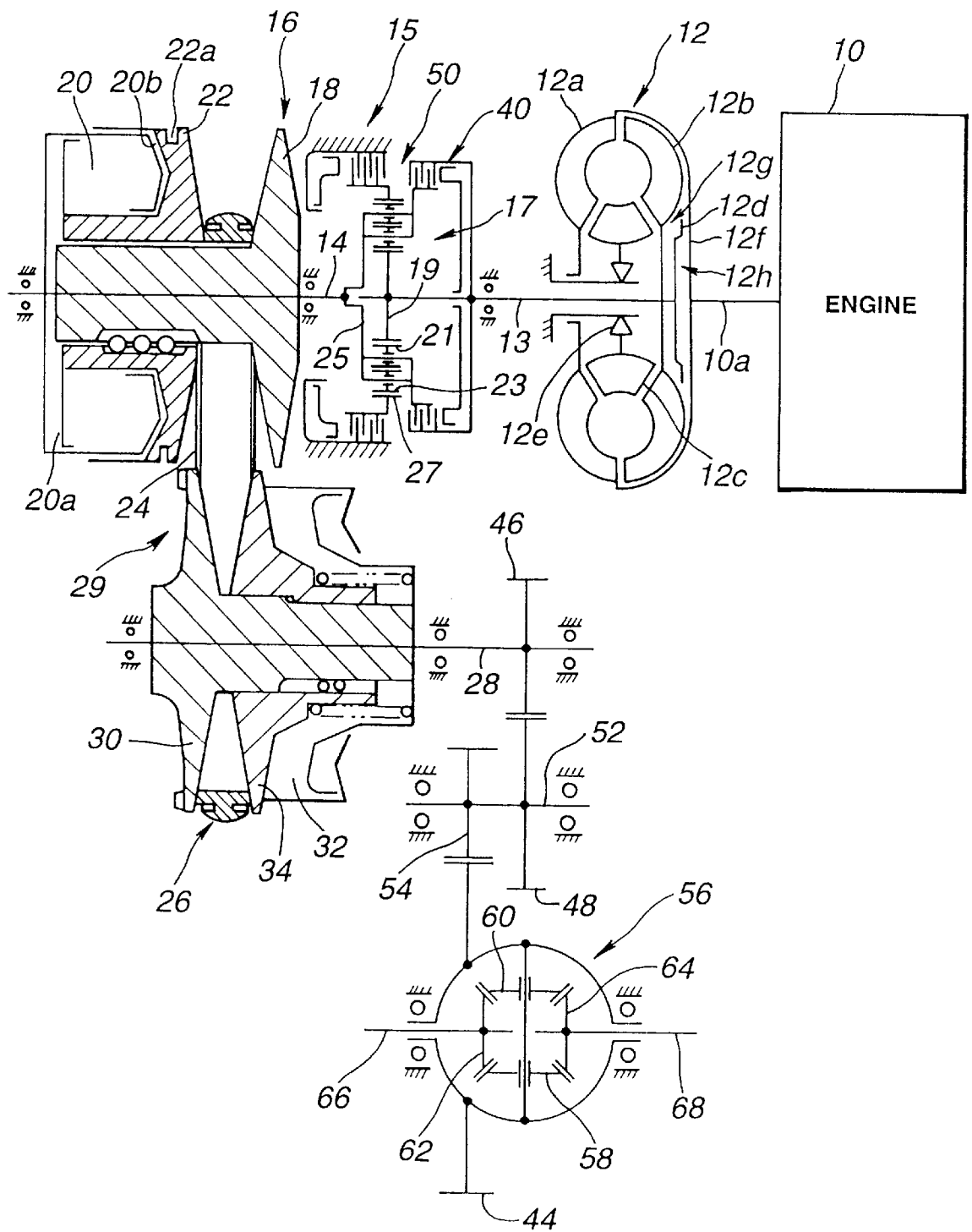
FIG. 1 is a schematic view showing a CVT power transmission system according to an embodiment of the present invention.

FIG. 1 is a skeleton view showing a CVT type power transmitting drive system according to one embodiment of the present invention. The drive system in this example includes at least an engine 10, a torque converter 12, a forward/reverse change over mechanism 15, a V belt type continuously variable transmission mechanism 29, and a differential unit 56. This drive system transmits rotation of an output shaft 10a of the engine 10 to left and right drive shafts 66 and 68 at a selected speed ratio in a selected rotational direction to drive a vehicle.

The torque converter 12 of this drive system is a lockup torque converter of a known type. The lockup torque converter 12 comprises a pump impeller (input member) 12a, a turbine runner or turbine (output member) 12b, a stator 12c, and a lockup facing member (or lockup clutch) 12d for providing a direct mechanical drive by directly coupling the input and output members 12a and 12b.

The impeller 12a is driven by the engine 10 through a torque converter cover 12f connected with the output shaft 10a of the engine 10. The turbine 12b is received in the cover 12f and confronts the impeller 12a. The pump impeller 12a and the turbine 12b define a fluid circuit so that power is transmitted therebetween by the dynamic fluid action. The turbine 12b is connected with the change over mechanism 15 by a shaft (turbine shaft) 13. The stator 12c is provided between the impeller 12a and the turbine 12b, and connected to a stationary member through a one-way clutch 12e.

The lockup facing member 12d is connected with the turbine shaft 13. The lockup facing member 12d separates an apply side fluid chamber 12g and a release side fluid chamber 12h. The release chamber 12h is formed between the cover 12f and the lockup facing member 12d, and the apply chamber 12g is on the opposite side of the lockup facing member 12d. When a fluid pressure is supplied into the apply chamber 12g, the lockup facing member 12d is pressed against the cover 12f, and the torque converter 12 is put in a lockup state in which the impeller 12a and the turbine 12b are directly connected. When the fluid is supplied sufficiently into the release chamber 12h, the lockup facing member 12d is disengaged from the cover 12f, and the torque converter 12 is held in ai non-lockup state (or unlockup state). The fluid pressure supplied to the release chamber 12h is drained through the apply chamber 12g.

The forward/reverse drive direction change over mechanism 15 comprises a planetary gear system 17, a forward clutch 40 and a reverse brake 50. The planetary gear system 17 comprises a sun gear 19, a plurality of double pinion sets each including an inner planet pinion 21 meshing with the sun gear 19 and an outer planet pinion 23 meshing with the inner pinion 21, a planet pinion carrier 25 carrying the planet pinions, and a ring (internal) gear 27 meshing with the outer planet pinions 23. The sun gear 19 is mounted on the turbine shaft 13 and drivingly connected with the turbine 12b by the turbine shaft 13. The forward clutch 40 is disposed between the turbine shaft 13 and the planet carrier 25 to make or break the connection therebetween. The reverse brake 50 is between the ring gear 27 and a stationary housing to hold the ring gear 27. The planet carrier 25 is drivingly connected with the V belt CVT mechanism 29 by a driver pulley shaft 14. The driver shaft 14 has an end portion surrounding the end of the turbine shaft 13.

The V belt CVT mechanism 29 comprises a driver pulley 16, a follower (or driven) pulley 26, and a V belt 24 for transmitting power between the pulleys.

The driver pulley 16 is mounted on the driver pulley shaft 14. The driver pulley 16 comprises an axially stationary fixed conical disk 18, and an axially movable conical disk 22, which confront each other and define a V-shaped pulley groove therebetween for receiving the V belt 24. The fixed disk 18 rotates as a unit with the driver shaft 14. By a fluid pressure in a driver pulley cylinder chamber 20, the movable disk 22 is axially movable. The driver pulley cylinder chamber 20 consists of a first chamber 20a and a second chamber 20b, and has a pressure receiving area twice as large as that of the follower pulley 26.

The follower pulley 26 is mounted on a follower pulley shaft 28. The follower pulley 26 comprises an axially stationary fixed conical disk 30, a follower pulley cylinder chamber 32, and an axially movable conical disk 34. The fixed and movable disks 30 and 34 confront each other and define a V-shaped pulley groove for receiving the V belt. The fixed disk 30 rotates as a unit with the follower shaft 28. The movable disk 34 is axially movable in dependence on a fluid pressure in the follower pulley cylinder chamber 32. The pressure receiving area of the follower pulley cylinder chamber 32 is smaller than that of the driver pulley cylinder chamber 20. In this example, the pressure receiving area of the follower pulley cylinder chamber 30 is half of the pressure receiving area of the driver pulley cylinder chamber 20.

There is provided, between the CVT mechanism 29 and the differential unit 56, a gear set comprising a drive gear 46, an idler gear 48, a pinion gear 54 and a final gear 44. The drive gear 46 is fixedly mounted on the follower shaft 28. The idler gear 48 is mounted on an idler shaft 52 and engaged with the drive gear 46. The pinion gear 54 is mounted on the idler shaft 52, and always in mesh with the final gear 44.

The differential unit 56 comprises differential pinion gears 58 and 60 and side gears 62 and 64. The pinion gears 58 and 60 are rotatably mounted on a differential pinion shaft which is supported on a differential case rotatable with the final gear 44. The side gears 62 and 64 are mounted on, and drivingly connected with, the left and right output shafts 66 and 68, respectively.

In this drive system, an input rotational force from the output shaft 10a of the engine 10 is transmitted through the torque converter 12 and the shaft 13, to the forward/reverse changeover mechanism 15. When the forward clutch 40 is engaged and the reverse brake 50 is disengaged, the changeover mechanism 15 transmits the rotation from the turbine shaft 13 to the driver pulley shaft 14 without changing the rotational direction, through the planetary gear mechanism 17 rotating as a unit. When the forward clutch 40 is disengaged and the reverse brake 50 is engaged to hold the ring gear 27, the planetary gear system 17 reverses the rotational direction, and drives the driver pulley shaft 14 in the reverse driving direction. The rotation of the driver pulley shaft 14 is further transmitted through the driver pulley 16, V belt 24, follower pulley 26, drive gear 46, idler gear 48, idler shaft 52, pinion gear 54 and final gear 44, to the differential unit 56. The left and right output shafts 66 and 68 rotate in the forward or reverse driving direction. When the forward clutch 40 and reverse brake 50 are both disengaged, the drive system is put in a neutral state.

The V belt CVT mechanism 29 can vary the effective radius of the contact position of each pulley with the belt 24 by shifting the movable disks 22 and 34 of the driver and follower pulleys 16 and 26 axially. By so doing, the CVT mechanism 29 can vary the speed ratio between the driver pulley 16 and the follower pulley 26. The V belt CVT mechanism 29 increases the input/output speed ratio (reduction ratio) by widening the V pulley groove of the driver pulley 16 to decrease the effective radius of the driver pulley 16, and narrowing the V pulley groove of the follower pulley 26 to increase the effective radius of the follower pulley 26. Conversely, the V belt CVT mechanism 29 decreases the input/output speed (reduction) ratio by narrowing the driver pulley 16 and widening the follower pulley 26. The shift control system is generally arranged to vary the pulley groove width of one of the driver and follower pulleys and allow the groove width of the other to be adjusted automatically. In the example in which the driving force is transmitted mainly in a pushing direction unlike an ordinary design in which the driving force is transmitted in a pulling direction, the CVT mechanism can control the groove width of the follower pulley 26, and allow the driver pulley 16 to be shifted automatically.

Figure 2:
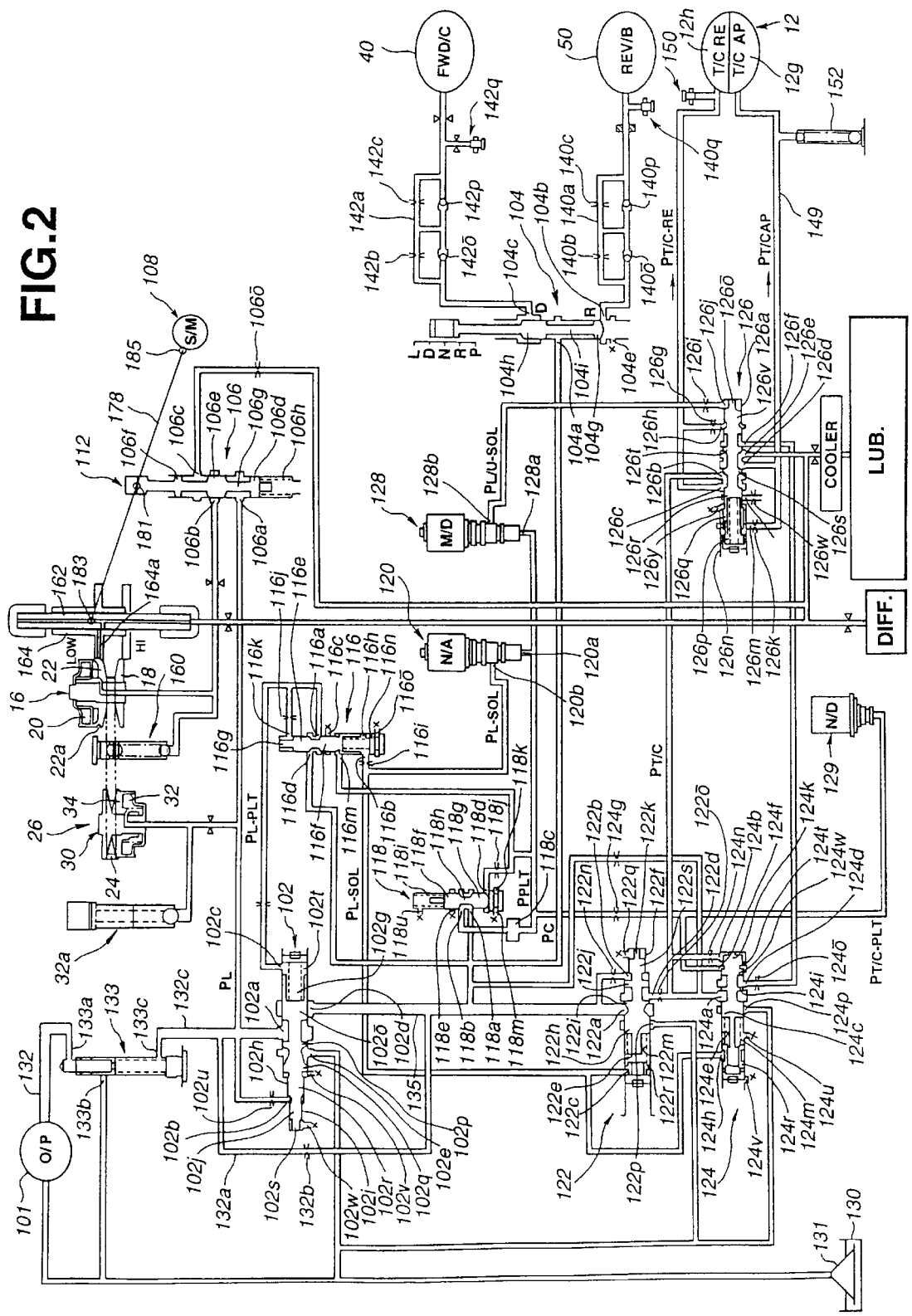
FIG. 2 is a schematic view showing a fluid pressure control hydraulic system for supplying controlled fluid pressures to the power transmission system of FIG. 1.

FIG. 2 shows a hydraulic fluid pressure control system for this CVT system.

Main components of the hydraulic system of FIG. 2 are; fluid (oil) pump 101, line pressure regulating valve (first pressure regulating valve or regulator) 102, manual valve 104, shift control valve 106, stepper motor 108, shift operating mechanism 112, pressure modifier valve 116, constant pressure regulating valve 118, modifier duty (solenoid) valve 120, clutch pressure regulating valve 122, torque converter pressure regulating valve (second pressure regulating valve or regulator) 124, lockup control valve 126, lockup duty (solenoid) valve 128, (pressure decreasing side) torque converter pressure selector valve 129, and shift command valve 150.

The fluid pump 101 draws a hydraulic fluid from a reservoir 130 through a strainer 131, and discharges the fluid into a fluid line 132. The fluid line 132 leads to an inlet port 133a of a flow control valve 133. The flow control valve 133 drains an excess amount of the fluid from a drain port 133b, and supplies a predetermined amount of the fluid from an outlet port 133c through a fluid line 132c to an upstream port 102a of the line pressure regulating valve 102 and a pressure decreasing side pilot port 102b provided with a restriction 102u.

The line pressure regulating valve 102 is arranged to generate a line fluid pressure PL of a predetermined pressure level on the upstream side of the upstream port 102a by regulating the fluid pressure supplied through the upstream port 102a. The regulated line pressure $P_L$ is supplied to the follower pulley cylinder chamber 32 and a port 106a of the shift control valve 106, respectively. A fluid line 132a provided with a restriction 132b branches off from the line 132b. The line 132a is connected to a fluid line 135 extending from a downstream port 102d of the line pressure regulating valve 102. The line 132a connects the line 132c on the upstream side and the line 135 on the downstream side together to some extent, bypassing the line pressure regulating valve 102. However, the restriction 132b allows different pressures to develop, respectively, on the upstream and downstream sides. The follow pulley cylinder chamber 32 is connected with a ball relief valve 32a for relieving an excess of the line pressure supplied to the follower pulley cylinder chamber 32.

The pressure modifier valve 116 has a valve spool 116g, a return spring 116h and a valve housing formed with six main ports. The six main ports are outlet port 116a, inlet port 116d, drain port 116c and pilot ports 116k, 116b and 116m. The outlet port 116a is connected to the pressure increase pilot port 102c of the line pressure regulating valve 102. The pilot port 116k feeds back the output pressure from this outlet port 116a to the pressure decreasing side through a restriction 116j. The pilot port 116b receives the output pressure of the modifier duty valve 120 as a pilot pressure on the pressure increasing side through a restriction 116i. The drain port 116c is connected to the reservoir 130. The pilot port 116m receives the output pressure of the constant pressure regulating valve 118 as a pilot pressure on the pressure decreasing side. The inlet port 116d is supplied with a clutch pressure from the downstream outlet port 102d of the line pressure regulating valve 102. The spool 116g has two lands 116e and 116f. The return spring 116h urges the spool 116g toward the pilot port 116b. The pressure modifier valve 116 further has a drain port 116o, located below the return spring 116h, for draining a fluid leakage from a plug 116n of the pilot port 116b.

When the pilot pressures to the pilot ports 116b and 116m are approximately equal to zero, the spool 116g is moved upwards as viewed in FIG. 2 by the return spring 116, and connects the inlet and outlet ports 116d and 116a fluidly.

When the engine 10 starts driving the pump 101, part of the fluid discharged from the pump 101 is delivered, as the clutch pressure $P_C$, from the downstream outlet port 102d of the line pressure regulating valve 102. The constant pressure regulating valve 118 receives this clutch pressure $P_C$ and delivers a drive pilot pressure $P_{PLT}$ of a constant pressure level to the pilot port 116m of the pressure modifier valve 116. In response to this pilot pressure, the spool 116g closes the inlet port 116d with the land 116e, and fluidly connects the outlet port 116a and the drain port 116c.

When, from this state, a pilot pressure (modifier control pressure) $P_{L\text{-}SOL}$ supplied from the modifier duty valve 120 to the pilot port 116b is increased, then the spool 116g moves upward again. In accordance with the modifier control pressure $P_{L\text{-}SOL}$ of the modifier duty valve 120, the spool 116g controls the fluid connection between the inlet port 116d and the outlet port 116a to control the output pressure, and supplies the controlled output pressure, as a modifier pilot pressure $P_{L\text{-}PLT}$, from the outlet port 116a to the pressure increasing side pilot port 102c of the line pressure regulating valve 102. The modifier duty valve 120 receives, as input pressure, the drive pilot pressure $P_{PLT}$ from the constant pressure regulating valve 118, and accordingly, the maximum value of the modifier control valve $P_{L\text{-}SOL}$ is equal to the drive pilot pressure $P_{PLT}$ (since the restriction 116i is inoperative when there is no escape of the fluid). When the pressure $P_{L\text{-}SOL}$ is maximum, therefore, a balance with the thrust of the spool 116g by the drive pilot pressure $P_{PLT}$ is attained in the pressure modifier valve 116, and the spool 116g moves upward only by the biasing force of the return spring 116h, and increases the modifier pilot pressure $P_{L\text{-}PLT}$.

The constant pressure regulating valve 118 has a valve housing, a spool 118h, a return spring 118i. The valve housing is formed with four main ports, which are inlet port 118a, outlet port 118b, pressure decreasing side pilot port 118d, and drain port 118e. The clutch pressure is supplied to the inlet port 118a from the downstream port 102d of the line pressure regulating valve 102. The outlet port 118b is connected through a filter 118c with the pilot port 116m of the pressure modifier valve 116. The output pressure is fed back from the outlet port 118b through the filter 118c and a restriction 118j to the pressure decreasing side pilot port 118d. The drain port 118e is connected to the reservoir 130. The spool 118h has two lands 118f and 118g. The return spring 118i urges the spool 118h toward the pressure decreasing side pilot port 118d. The constant pressure regulating valve 118 further has a drain port 118m located below the pilot port 118d in FIG. 2, for draining a fluid leakage from a plug 118k for the pilot port 118d, and a drain port 118u, located above the return spring 118i in FIG. 2, for draining a fluid leakage from the spool 118h.

From the clutch pressure $P_C$ produced on the downstream side of the line pressure regulating valve 102, the constant pressure regulating valve 118 produces a constant fluid pressure corresponding to the force of the return spring 118i by the pressure regulating action of the feedback pilot pressure. This constant pressure is supplied from the outlet port 118b through the filter 118c to the modifier duty valve 120, the lockup duty valve 128 and the pressure modifier valve 116. The output pressure through the filter 118c of the constant pressure regulating valve 118 is conducted through the restriction 124g to a pressure increasing side pilot port 124f of the torque converter pressure regulating valve 124. This pilot port 124f is further connected to the torque converter pressure selector valve 129 which is an on-off selector valve for allowing or preventing drainage. The restriction 124g separates the output pressure of the constant pressure regulating valve 118 and the pilot pressure to the converter pressure regulating valve 124. Thus, the output pressure of the constant pressure regulating valve 118 can be regarded as an original pressure of the pilot pressure to the converter pressure regulating valve 124. Hereinafter, the output pressure of the constant pressure regulating valve 118 is referred to as drive pilot pressure $P_{PLT}$, and the pilot pressure supplied through the restriction 124g to the converter pressure regulating valve 124 is referred to as torque converter driving pilot pressure $P_{T/C\text{-}PLT}$ for distinction from other pilot pressures.

The torque converter pressure selector valve 129 is a solenoid on-off valve for enabling or disabling drainage of the torque converter driving pilot pressure $P_{T/C\text{-}PLT}$. In response to an on-off signal from a shift control unit 300, the selector valve 129 controls the drainage of the torque converter driving pilot pressure $P_{T/C\text{-}PLT}$ in the on-off control manner. In this example, the selector valve 129 drains the pilot pressure in the OFF state, and blocks the drain in the ON state.

The modifier duty valve (modifier solenoid valve) 120 has inlet and outlet ports 120a and 120b. The inlet port 120a is connected with the outlet port 118b of the constant pressure regulating valve 118. The outlet port 120b is connected to the pilot port 116b through the restriction 116i, and to an external pilot port 122c of the clutch pressure regulating valve 122 and an external pilot port 124h of the converter pressure regulating valve 124. The modifier duty valve 120 delivers a modifier control pressure PL-SOL from the outlet port 120b in response to a drive signal from the shift control unit 30. The drive signal is a current signal of a controlled duty ratio (or duty factor) corresponding to a target speed ratio, and the modifier control pressure PL-SOL varies in accordance with the duty ratio. In this example, the modifier control pressure PL-SOL is maximum when the duty ratio is "0", and equal to a minimum value of zero when the duty ratio is "100".

The lockup duty valve (or lockup solenoid valve) 128 has an inlet port 128a connected with the outlet port 118b of the constant pressure regulating valve 118, and an outlet port 128b connected with a pilot port 126j of the lockup control valve 126. In response to a drive current of a predetermine duty ratio (or duty factor) supplied from the shift control unit 300, the lockup duty valve 128 delivers a lockup control pressure PL/U-SOL from the outlet port 128b. In this example, the lockup control pressure PL/U-SOL is equal to a minimum value of zero when the duty ratio is "0", and maximum when the duty ratio is "100".

The line pressure regulating valve (or first pressure regulating valve) 102 has a valve housing formed with a cylinder bore and five main ports, a valve element in the form of a spool 102s and a return spring 102t. The first main port is the upstream port 102a formed in a large diameter bore section 102g of the cylinder bore. The second is the pressure increasing side pilot port 102c connected with the outlet port 116a of the pressure modifier valve 116. The third is the downstream port 102d located axially between the pilot port 102c and the upstream port 102a, and connected with an upstream port 122a of the clutch pressure regulating valve 122. The forth main port is a drain port 102e connected to the reservoir 130. The upstream port 102a is located axially between the downstream port 102d and the drain port 102e. The fifth is the pilot port 102b for receiving a pilot pressure from the flow regulating valve 133. The pilot port 102b is formed in a medium diameter bore section 102h extending from the large diameter bore section 102g. The line pressure regulating valve 102 further has a drain port 102v formed in a connecting portion between the large and medium diameter bore sections 102g and 102h, and a drain port 102w formed in an end portion of a small diameter bore section 102i extending from the medium diameter section 102h. The spool 102s is a single unit having spool sections corresponding to the bore sections 102g~102i. The return spring 102t urges the spool 102s leftwards as viewed in FIG. 2. The spool 102s has a land 102o for closing the downstream port 102d and for receiving the pilot pressure supplied from the pressure modifier valve 116 to the pressure increasing side pilot port 102c; a land 102p for shutting off the upstream port 102a and the drain port 102e; a land 102q for shutting off the drain port 102e and the adjacent drain port 102v; a land 102r for shutting off the drain port 102v and the pressure decreasing side pilot port 102b and for receiving the pilot pressure supplied from the flow regulating valve 133 to the pilot port 102b; and a land 102i for shutting off the pilot port 102b and the drain port 102w. Between the lands 102p and 102q, there is formed a groove designed to form a restriction between the drain port 102e and the side portion of the land 102q confronting the drain port 102e, and to decrease the opening size of the restriction as the spool 102s moves rightwards in FIG. 2.

In the thus-constructed line pressure regulating valve 102, the spool 102s moves right and left in FIG. 2 in dependence on thrust balance by the pilot pressures to the pilot ports 102b and the 102c and the pressure receiving areas. When the two pilot ports 102b and 102c receive no pilot pressures, the spool 102s is moved leftwards as shown in FIG. 2 by the force of the return spring 102t, and disconnects the upstream port 102a from each of the downstream port 102d and the drain port 102e. When the pilot pressure, that is the line pressure, supplied from the flow regulating valve 133 to the pressure decreasing side pilot port 102b becomes high, then the spool 102s moves rightwards, and opens the upstream port 102a to both of the downstream port 102d and the drain port 102e. As the line pressure PL becomes higher, the amount of the rightward movement of the spool 102s increases and the opening area increases between the upstream port 102a and the land 102p. However, the opening size of the restriction formed between the drain port 102e and the land 102q becomes smaller in a direction to decrease the amount of the fluid drained from the drain port 102e, and the opening size between the downstream port 102d and the land 102o increases. Therefore, an increase in the line pressure causes an increase in the clutch pressure (the original pressure of the clutch pressure, to be exact) supplied from the downstream port 102d to the clutch pressure regulating valve 122. When, on the other hand, the line pressure PL is not so high, the clutch pressure (or its original pressure) does not become so high because the opening size of the restriction between the drain port 102e and the land 102q becomes larger, but the opening size between the upstream port 102a and the land 102p to the drain side becomes smaller and the opening size between the downstream port 102d and the land 102o also becomes smaller. This operation is equivalent to the operation of a constant pressure regulating valve, and the line pressure produced on the upstream side of the line pressure regulating valve 102 is held constant.

Figure 3:
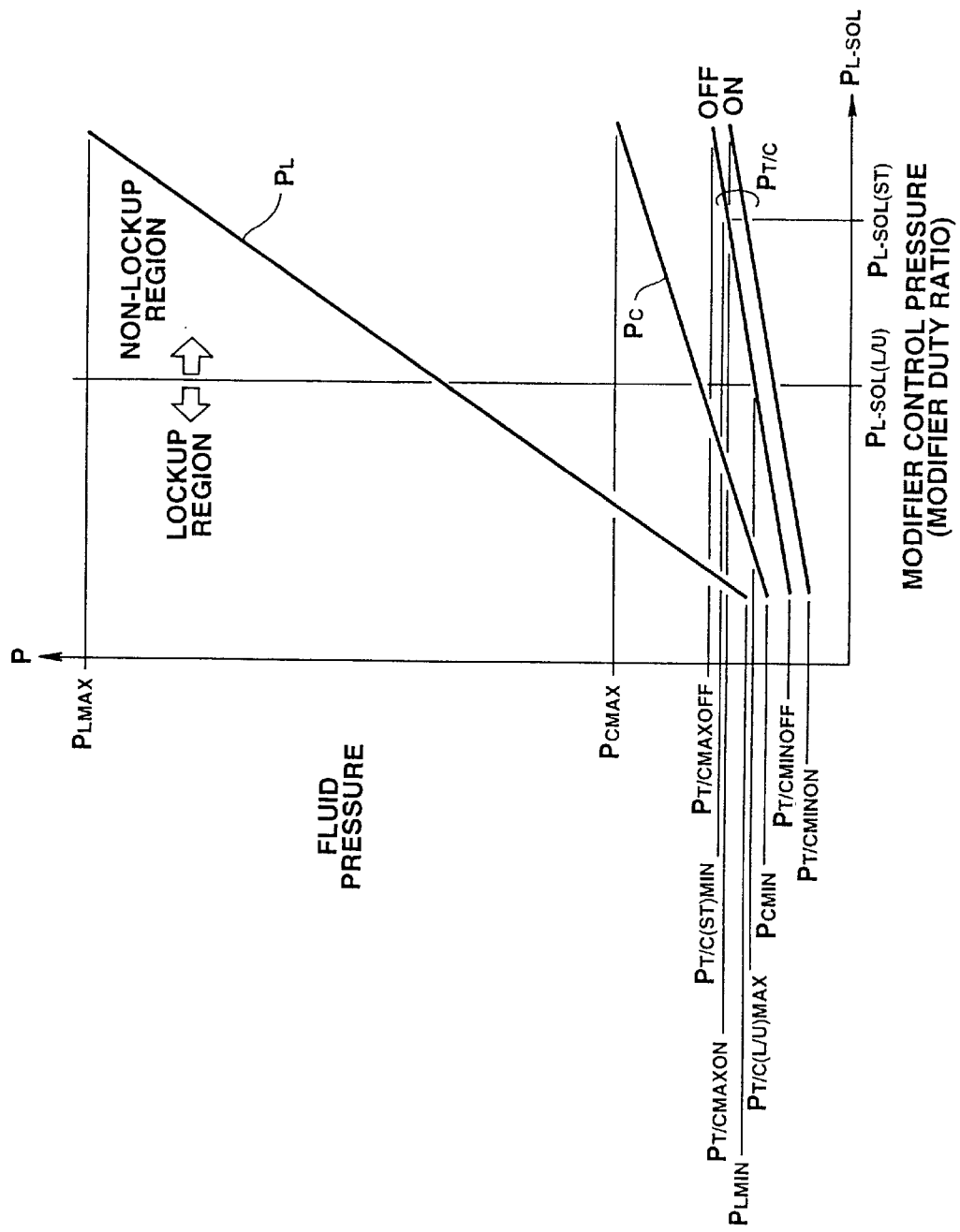
FIG. 3 is a graph showing characteristics of fluid pressures controlled by the hydraulic system of FIG. 2.

In this embodiment, however, an increase of the modifier pilot pressure PL-PLT causes the spool 102s to move leftwards, and decrease the flow from the downstream port 102d in accordance with this pilot pressure. In this case, the opening size of the restriction between the drain port 102e and the land 102q increases, and the opening size between the upstream port 102a and the land 102p decreases. As a whole, the line pressure at the upstream port 102a becomes higher. The pilot pressure PL-PLT is varied in dependence on the modifier control pressure PL-SOL corresponding to the duty ratio for the modifier duty valve 120. Therefore, this control system can control the line pressure PL by adjusting the duty ratio to the modifier duty valve 120. In this embodiment, except for a dead band region, the line pressure PL increases linearly with increase in the modifier control pressure PL-SOL from a minimum line pressure value PLMIN to a maximum line pressure value PLMAX, as shown in FIG. 3. The drain port 102v drains a fluid leakage from the large diameter section 102g, and the drain port 102w drains a fluid leakage from the medium diameter section 102h and the small diameter section 102i.

The manual valve 104 has a valve housing formed with four main ports and a spool 104i having lands 104g and 104h. The four main ports are: an inlet port 104a connected to the downstream port 102d of the line pressure regulating valve 102; an R range port 104b connected to the reverse brake 50; a D range port 104c connected with the forward clutch 40; and a lower end drain port 104e. The spool 104i is operated by a select lever (not shown) provided near a driver's seat in the vehicle, and has five stop positions for P, R, N, D and L ranges. When the driver's select lever is shifted to the L or D range, the inlet port 102a and the D range port 104c are fluidly connected together, and the clutch pressure on the upstream side of the clutch pressure regulating valve 122 is supplied to the forward clutch 40. When the driver's select lever is put in the R range, the inlet port 102a and the R range port 104b are fluidly connected together, and the clutch pressure is supplied to the reverse brake 50. In this example, the clutch pressure is supplied neither to the forward clutch 40 nor the reverse brake 50 when the select lever is in the P range.

In the fluid line connecting the R range port 104b and the reverse brake 50, there are provided a first check valve 140o for checking the flow of the fluid in the direction from the reverse brake 50 toward the manual valve 104, and a second check valve 140p for checking the fluid flow in the direction from the manual valve 104 toward the reverse brake 50. Restrictions 140b and 140c are disposed in a bypass line 140a detouring these check valves 140o and 140p. A middle point in the bypass line 140a between the restrictions 140b and 140c is fluidly connected to a point between the check valves 140o and 140p. This combination of the check valves and restrictions functions to cushion the shift shock caused by the shift operation to the R range. A reference numeral 140q indicates a detection hole for detecting the fluid pressure supplied to the reverse brake 50.

In the fluid line connecting the D range port 104c and the forward clutch 40, there are provided a first check valve 142o for checking the flow of the fluid in the direction from the forward clutch 40 toward the manual valve 104, and a second check valve 142p for checking the fluid flow in the direction from the manual valve 104 toward the forward clutch 40. Restrictions 142b and 142c are disposed in a bypass line 142a detouring these check valves 142o and 142p. A middle point in the bypass line 142a between the restrictions 142b and 142c is fluidly connected to a point between the check valves 142o and 142p. This combination of the check valves and restrictions functions to cushion the shift shock caused by the shift operation to the D or L range. A reference numeral 142q indicates a detection hole for detecting the fluid pressure supplied to the forward clutch 40.

The clutch pressure regulating valve 122 has a valve housing, a valve element in the form of a spool 122k and a return spring 122m. The valve housing is formed with five main ports, which are: an upstream port 122a, a pressure decreasing pilot port 122b, a pressure increasing pilot port 122c, a downstream port 122d and a drain port 122p. The upstream port 122a is formed in a large diameter bore section 122e in the cylinder bore of the valve 122, and connected with the downstream port 102d of the ling pressure regulating valve 102. The clutch pressure (or its original pressure) is supplied to the upstream port 122a. The clutch pressure is supplied through a restriction 122n to the pressure decreasing pilot port 122b as a pressure decreasing pilot pressure. The downstream port 122d is formed between the upstream port 122a and the pilot port 122b, and connected through a restriction 122o with the upstream port 124a of the converter pressure regulating valve 124. The upstream port 122a is located between the downstream port 122d and the drain port 122p. The pressure increasing pilot port 122c is formed in a left end portion of the valve 122, and connected with the outlet port 120b of the modifier duty valve 120. The clutch pressure regulating valve 122 further has a drain port 122q formed in a medium diameter bore section 122f extending rightwards in FIG. 2 from the large diameter section 122e. The spool 122k has spool sections corresponding to the bore sections 122e and 122f. The return spring 122m urges the spool 122k rightwards in FIG. 2. A plug 122r receives the pilot pressure from the pressure increasing pilot port 122c, and moves the spool 122k together with the return spring 122m in the rightward direction in FIG. 2. The spool 122k has a land 122h for closing the drain port 122p; a land 122i for shutting off the upstream port 122a and the downstream port 122d from each other; a land 122j for shutting off the downstream port 122d and the pressure decreasing pilot port 122b and receiving the pilot pressure supplied to the pilot port 122b; and a land 122s for shutting off the pilot port 122b and the drain port 122q from each other. A groove between the lands 122h and 122i is designed to form a restriction between the drain port 122p and the upstream port 122a during a leftward movement of the spool 122k, and to decrease the opening size of the restriction in accordance with the amount of movement of the spool 122k.

In the thus-constructed clutch pressure regulating valve 122, the spool 122k moves right and left in FIG. 2 in dependence on thrust balance by the pilot pressures to the pilot ports 122b and the 122c and the pressure receiving areas. When the pilot pressure to the pressure increasing pilot port 122c is absent and the clutch pressure is high, the amount of leftward movement of the spool 122k is increased, resulting in an increase in the amount of the fluid flowing from the upstream port 122a to the downstream port 122d. This increases the torque converter pressure (the original pressure of the torque converter pressure PT/C, to be exact) supplied from the downstream port 122d to the torque converter pressure regulating valve 124. When, on the other hand, the clutch pressure is not so high, the restriction of the drain port 122p and the land 122h is opened wider, but the opening size of the upstream port 122a and the land 122i to the drain side is decreased together with a decrease in the opening area of the downstream port 122d and the land 122j. Accordingly, the torque converter pressure (its original pressure) does not become so high. In this state, the clutch pressure on the upstream side of the clutch pressure regulating valve 122 is held constant in the same manner as in a so-called constant pressure regulating valve. When, however, the modifier control pressure PL-SOL supplied from the modifier duty valve 120 to the pressure increasing pilot port 122c becomes higher, then the plug 122r is moved rightwards in accordance with the modifier control pressure. This rightward movement of the plug 122r increases the biasing force of the return spring 122m, and thereby makes the clutch pressure high by causing the spool 122s to move rightwards and to decrease the amount of the fluid from the downward port 122d. Thus, by adjusting the modifier control pressure PL-SOL by adjusting the duty ratio to the modifier duty valve 120, the control system can control the clutch pressure PC simultaneously. Although the clutch pressure PC is smaller in intercept than the line pressure because of the magnitudes of the original pressures, the clutch pressure PC increases as the line pressure increases. In this example, as shown in FIG. 3, except for a predetermined dead band region, the clutch pressure PC increases linearly from a minimum clutch pressure valve PCMIN to a maximum clutch pressure value PCMAX in accordance with the modifier control valve PL-SOL. A further drain port 122q drains a leakage from the large diameter bore section 122e.

The torque converter pressure regulating valve (second pressure regulating valve) 124 has a valve housing formed with six main ports and a cylinder bore having large and medium diameter sections 124e and 124t, a valve element in the form of a spool 124k, a return spring 124m and a plug 124r. The six main ports are upstream port 124a, pressure decreasing side pilot port 124b, downstream port 124d, pressure decreasing side pilot port 124*f*, drain port 124*p* and pressure increasing side pilot port 124*h*. The upstream port 124*a* is formed in the large diameter bore section 124*e*, connected with the downstream port 122*d* of the clutch pressure regulating valve 122, and arranged to receive the torque converter pressure (its original pressure). The torque converter pressure is supplied through the restriction 124*n* to the pressure decreasing pilot port 124*b* as a pressure decreasing pilot pressure. The port 124*b* is formed in the medium diameter bore section 124*t* extending from the large diameter bore section 124*e*. The downstream port 124*d* is formed in the large diameter section 124*e* between the upstream port 124*a* and the pilot port 124*b*, and connected through a restriction 124*o* with a lubrication inlet port 126*f* of the lockup control valve 126. The pressure decreasing pilot port 124*f* is formed in the large diameter section 124*e* between the downstream port 124*d* and the pilot port 124*b*, and arranged to receive the torque converter driving pilot pressure $P_{T/C}$-PLT through the restriction 124*g* from the constant pressure regulating valve 118. The upstream port 124*a* is located between the downstream port 124*d* and the drain port 124*p*. The pressure increasing pilot port 124*h* is formed in the left end portion and connected with the outlet port 120*b* of the modifier duty valve 120. There are further formed a drain port 124*u* formed on the left side of the drain port 124*p*, and a drain port 124*v* formed in the left end portion of the large diameter section 124*e*. The spool 124*k* is a single unit having sections corresponding to the bore sections 124*e* and 124*t*. The return spring 124*m* urges the spool 124*k* rightwards. The plug 124*r* is arranged to receive the pilot pressure supplied to the pressure increasing pilot port 124*h*, and to move the spool 124*k* together with the spring 124*m* rightwards. The spool 124*k* has a land 124*c* for closing the drain port 124*p*, a land 124*i* for shutting off the upstream and downstream ports 124*a* and 124*d*, a land 124*j* for shutting off the downstream port 124*d* and the pressure decreasing pilot port 124*f*, and for receiving the torque converter drive pilot pressure $P_{T/C}$-PLT supplied to the pilot port 124*f*, and a land 124*w* for shutting off the pressure decreasing pilot ports 124*f* and 124*b* and for receiving the pilot pressure which is a partial pressure of the torque converter pressure, supplied to the pilot port 124*b*.

In the thus-constructed torque converter pressure regulating valve 124, the spool 124*k* moves right and left in FIG. 2 in dependence on thrust balance by the pilot pressures supplied to the pilot ports and the pressure receiving sizes. When the pilot pressures to the pressure increasing pilot port 124*h* and the pressure decreasing pilot port 124*f* are absent and the torque converter pressure is high, the amount of leftward movement of the spool 124*k* is increased, resulting in an increase in the amount of the fluid flowing from the upstream port 124*a* to the downstream port 124*d*. This increases the fluid pressure supplied from the downstream port 124*d* to the lubrication inlet port 126*f* of the lockup control valve 126. When, on the other hand, the torque converter pressure is not so high, the opening size of the upstream port 124*a* and the land 124*i* to the drain side is decreased, and simultaneously the opening size of the downstream port 124*d* and the land 122*j* is decreased. Accordingly, the fluid pressure to the lubrication inlet port 126*f* does not become so high. In this state, the torque converter pressure $P_{T/C}$ supplied from the upstream side of the torque converter pressure regulating valve 124 to the inlet port 126*b* of the lockup control valve 126 is held constant in the same manner as in a so-called constant pressure regulating valve. When, however, the modifier control pressure $P_{L\text{-SOL}}$ supplied from the modifier duty valve 120 to the pressure increasing pilot port 124*c* becomes higher, then the plug 124*r* is moved rightwards in accordance with the modifier control pressure. This rightward movement of the plug 124*r* increases the biasing force of the return spring 124*m*, and thereby makes the torque converter pressure $P_{T/C}$ high by causing the spool 124*s* to move rightwards and to decrease the amount of the fluid from the downward port 124*d*. Thus, by adjusting the modifier control pressure $P_{L\text{-SOL}}$ by adjusting the duty ratio to the modifier duty valve 120, the control system can control the torque converter pressure $P_{T/C}$ simultaneously. The torque converter pressure $P_{T/C}$ is smaller in intercept than the clutch pressure because of the magnitudes of the original pressures. The torque converter pressure $P_{T/C}$ increases as the clutch pressure increases. In this example, the torque converter pressure selector valve 129 is the on-off selector valve. The rate of increase of the torque converter pressure with respect to the modifier control pressure remain unchanged between to the on and off states of the selector valve 129. However, the intercept of the torque converter pressure is greater in the off state of the selector valve 129 than that in the on state. The drain port 124*u* drains a leakage in the large diameter bore section 124*e*, and the drain port 124*v* drains a leakage to the outside of the large diameter section 124.

As shown in FIG. 3, with increase in the modifier control pressure $P_{L\text{-SOL}}$, the torque converter pressure $P_{T/C}$ in this example increases linearly from an off time minimum torque converter pressure value $P_{T/CMIN\text{-OFF}}$ to an off time maximum torque converter pressure value $P_{T/CMAX\text{-OFF}}$ when the selector valve 129 is in the OFF state, and linearly from an on time minimum torque converter pressure value $P_{T/CMIN\text{-ON}}$ to an on time maximum torque converter pressure value $P_{T/CMAX\text{-ON}}$ when the selector valve 129 is in the ON state, except for a predetermined dead band region. The rate of increase of the torque converter pressure with respect to the modifier control pressure remains unchanged between the on and off states of the selector valve 129, and the slope of the off time torque converter pressure $P_{T/C\text{-OFF}}$ is equal to the slope of the on time torque converter pressure $P_{T/C\text{-ON}}$. The straight line characteristic of the off time torque converter pressure $P_{T/C\text{-OFF}}$ is higher than the line of $P_{T/C\text{-ON}}$.

The control system determines the modifier control pressure $P_{L\text{-SOL}}$ in accordance with an input load to the CVT mechanism 26 such as the engine output (torque) and the reduction ratio (speed ratio) of the CVT mechanism 26, and the speed ratio of the CVT mechanism 26 is determined in accordance with the vehicle speed and the throttle opening degree. On the other hand, the control system determines whether to lockup the torque converter 12 or not, that is the duty ratio of the lockup duty valve 128, in dependence on the vehicle speed (the rotational speed of the turbine 12*b* equivalent to the vehicle speed), the throttle opening and the engine speed. Therefore, the control system can approximately detect or estimate whether the torque converter is in the lockup state or in the non-lockup state, by monitoring the line pressure $P_L$, provided that there exists a linear relation between the engine torque and the engine speed.

The setting in this example is such that the torque converter 12 is in the non-lockup state when the modifier control pressure $P_{L\text{-SOL}}$ is equal to or higher than a predetermined lockup switching value $P_{L\text{-SOL}(L/U)}$, and in the lockup state when the modifier control pressure is lower than the value $P_{L\text{-SOL}(L/U)}$. The off period torque converter pressure $P_{T/C\text{-OFF}}$ at the value of the modifier control pressure $P_{L\text{-SOL}}$ equaling the lockup switching value $P_{L\text{-SOL}(L/U)}$ is set equal to a lockup maximum torque converter pressure value $P_{T/C(L/U)MAX}$. There exists a predetermined correlation between the engine rotational speed causing drag of the lockup in the stall start, and the vehicle speed or the turbine speed because of the rotational inertia of the engine. This corresponds to a point of the line pressure P<small>L</small>, or the modifier control pressure P<small>L-SOL</small>, determined in accordance with the engine speed and the vehicle speed or the turbine speed. When the modifier control pressure P<small>L-SOL</small> causing the lockup drag in the stall start is equal to a predetermined dragging value P<small>L-SOL(ST)</small>, the off period torque converter pressure P<small>T/C-OFF</small> at the value of the modifier control pressure equaling the predetermined dragging value P<small>L-SOL(ST)</small> is set equal to a drag preventive minimum torque converter pressure P<small>T/C(ST)MIN</small>.

The lockup maximum torque converter pressure value P<small>T/C(L/U)MAX</small> is set lower than or equal to a mechanical withstanding pressure of the torque converter 12. The off period minimum torque converter pressure value P<small>T/CMIN-OFF</small> is set at a value capable of ensuring an input-output pressure difference of the torque converter 12, required to maintain the lockup state even in the high output, high speed vehicle operating region. The drag preventive minimum torque converter pressure P<small>T/C(ST)MIN</small> is equal to or higher than the withstanding pressure of the torque converter 12, and equal to or higher than a pressure level to maintain the non-lockup state of the torque converter 12 in the stall start operation. That is, the drag preventive minimum torque converter pressure P<small>T/C(ST)MIN</small> is equal to or higher than the fluid pressure level required to allow a sufficient fluid flow between the lockup clutch 12$d$ and the converter cover 12$f$ and ensure a sufficient clearance therebetween by building an input-output pressure difference in the torque converter 12 when supplied into the release chamber 12$h$. The on period minimum torque converter pressure P<small>T/CMIN-ON</small> is equal to or lower than a pressure level required to lessen the load on the pump 101 by restraining override of the clutch pressure P<small>C</small> on the upstream side of the clutch pressure regulating valve 122 and override of the line pressure P<small>L</small> on the upstream side of the line pressure regulating valve 102.

The lockup control valve 126 has a valve housing formed with a cylinder bore and nine main ports, a spoof 126$o$, a return spring 126$p$ and a movable plug 126$q$. The nine main ports are: an inlet port 126$b$ formed in a small diameter bore section 126$a$ of the cylinder bore, connected with the upstream port 124$a$ of the converter pressure regulating valve 124, and supplied with the torque converter pressure P<small>T/C</small>; a release side outlet port 126$c$ formed adjacently on the left side of the inlet port 126$b$ and connected with the release side fluid chamber 12$h$ of the torque converter 12; an apply side outlet port 126$d$ formed adjacently on the right side of the inlet port 126$b$ and connected with the apply side fluid chamber 12$g$ of the torque converter 12; a lubrication outlet port 126$e$ formed on the right side of the apply side outlet port 126$d$, connected with lubricating systems of cooler, differential gear, power train and belt, and further connected with a lubricating systems of the drive pulley 12 and the belt 24 through a fluid passage of a guide shaft 162 of the shift operating mechanism 112; a lubrication inlet port 126$f$ formed adjacently on the right side of the lubrication outlet port 126$e$ and connected through the restriction 124$o$ with the downstream port 124$d$ of the converter pressure regulating valve 124; a pressure decreasing pilot port 126$h$ formed on the right side of the lubrication inlet port 126$f$ and connected to receive the release side torque converter pressure P<small>T/C-RE</small> discharged from the release side outlet port 126$c$ through a restriction 126$g$ as a feedback pressure; a lockup switching pilot port 126$j$ formed on the right side of the pilot port 126$h$, and connected to receive, through a restriction 126$i$, the lockup control pressure P<small>L/U-SOL</small> from the lockup duty valve 128$b$; a pressure decreasing pilot port 126$m$ formed in a large diameter bore section 126$n$ of the cylinder bore and connected to receive, through a restriction 126$k$, the apply side torque converter pressure P<small>T/C-AP</small> from the apply side outlet port 126$d$ as a feedback pressure; and a drain port 126$x$ formed adjacently on the left side of the release side outlet port 126$c$ and connected through a restriction 126$w$ with the reservoir 130. The valve housing is further formed with a drain port 126$y$ for draining a fluid leakage in the large diameter section 126$n$. The spool 126$o$ has sections corresponding to the bore sections 126$a$ and 126$n$. The return spring 126$p$ urges the spool 126$o$ rightwards in FIG. 2. The plug 126$q$ receives the feedback pressure of the apply side torque converter pressure P<small>T/C-AP</small> from the pressure decreasing pilot port 126$m$, and directly moves the spool 126$o$ rightwards. The spool 126$o$ has a land 126$r$ for closing the drain port: 126$x$; a land 126$s$ for shutting off the inlet port 126$b$ from the apply side outlet port 126$d$ or the release side outlet port 126$c$; a land 126$t$ for shutting off the lubrication outlet port 126$e$ from the lubrication inlet port 126$f$ or the apply side outlet port 126$d$; a land 126$u$ for shutting off the lubrication inlet port 126$f$ and the pilot port 126$h$ from each other and for receiving the feedback pressure of the release side converter pressure P<small>T/C-RE</small> supplied to the pilot port 126$h$; and a land 126$v$ for shutting off the pilot ports 126$h$ and 126$j$ from each other and for receiving the lockup control pressure P<small>L/U-SOL</small> supplied to the pilot port 126$j$.

The lubrication outlet port 126$e$ is further connected with a drain port 106$c$ of the shift control valve 106 through a restriction 106$o$. This connection is intended to supply a remaining amount of the fluid from the drain port 106$c$ of the shift control valve 106 to the lubricating systems. The restriction 106$o$ develops a pressure difference between the upstream and downstream sides, and prevents the fluid pressure from the lubrication outlet port 126$e$ from reaching the shift control valve 106. In each lubricating system, the fluid lubricates various parts and then drains. In the fluid line connecting the apply side outlet port 126$d$ and the torque converter 12, there is disposed a relief valve 152 for relieving abnormally high pressure. There is further provided a detection hole 150 for detecting the fluid pressure supplied to the release side fluid chamber 12$h$ of the torque converter 12.

When the lockup control pressure P<small>L/U-SOL</small> of the lockup duty valve 128 is approximately zero, the spool 126$o$ is moved rightwards in FIG. 2 by the return spring 126$p$, to a state connecting the inlet port 126$b$ to the release side outlet port 126$c$, and connecting the apply side outlet port 126$d$ with the lubrication outlet port 126$e$. Thus, the torque converter pressure P<small>T/C</small> is supplied, as the release side torque converter pressure P<small>T/C-RE</small> from the inlet port 126$b$ through the release side outlet port 126$c$ to the release side converter fluid chamber 12$h$, so that the torque converter 12 is put in the non-lockup state. Then, the operating fluid flows from the apply side chamber 12$g$ through the line 149 to the apply side outlet port 126$d$ of the lockup control valve 126. The fluid further flows from the lubrication outlet port 126$e$ to the lubricating systems, and then drains. When, on the other hand, the lockup control pressure P<small>L/U-SOL</small> becomes so high that the thrust determined by the product resulting from multiplication of the lockup control pressure by the pressure receiving area of the land 126$v$ exceeds the biasing force of the return spring 126$p$, and pushes the spool 126$o$ rightwards to its rightmost position, the lockup control valve 126 builds the fluid connection between the release side outlet port 126c and the drain port 126zx, the fluid connection between the inlet port 126b and the apply side outlet port 126d and the fluid connection between the lubrication input and outlet ports 126f and 126e. Therefore, the torque converter pressure P$_{T/C}$ is supplied, as the apply side torque converter pressure P$_{T/C-AP}$ from the inlet port 126b through the apply side outlet port 126d to the apply side converter fluid chamber 12g, so that the torque converter 12 is put in the lockup state. The operating fluid in the release side chamber 12h is drained gradually from the release side outlet port 126c through the drain port 126x via the restriction 126w. At the same time, the fluid from the lubrication inlet port 126f is delivered from the lubrication outlet port 126e to the lubricating systems to lubricate various parts. When the lockup control pressure P$_{L/U-SOL}$ is relatively high but not so high as to push the spool 126o rightwards to its rightmost position, the inlet port 126b is connected to both of the apply side and release side outlet ports 126d and 126c. In this state, the lockup control valve 126 supplies the fluid pressures corresponding the opening areas of the respective ports to the release and apply chambers 12h and 12g. As a result, the clearance (or spacing) between the lockup clutch 12d and the converter cover 12f is reduced until a pressure balance between both chambers is reached, and the torque converter 12 is put in a half-lockup state in which the lockup clutch 12d and the converter cover 12f slip to some extent and drag to rotate together to some extent in dependence on the reduction of the clearance.

The shift: control valve 106 has a valve housing formed with inlet port 106a, outlet port 106b and drain port 106c, a spool 106g having lands 106d, 106e and 106f, and a return spring 106h for urging the spool 106g upwards in FIG. 2. The inlet port 106a is connected with the upstream port 102a of the line pressure regulating valve 102. The outlet port 106b is connected with the cylinder chamber 20 of the driver pulley 16. The drain port 106c is connected through the restriction 106o to the lubricating systems. A first end (or upper end) of the spool 106g is rotatably connected with a middle of a lever 178 of the shift operating mechanism 112 by a pin 181. A relief valve 160 for relieving abnormally high pressure is connected to the fluid line between the outlet port 106b and the driver pulley cylinder chamber 20. To hold the speed ratio constant, the land 10e closes the outlet port 106b, and cuts off the supply of the line pressure to the driver pulley cylinder chamber 20. When the spool 106g moves upwards in FIG. 2, the shift control valve 106 connects the input and outlet ports 106a and 106b together to increase the fluid pressure in the driver pulley cylinder chamber 20 by supplying the line pressure, and thereby causes the driver pulley 16 to decrease the V-shaped pulley groove width and the follower pulley 26 to increase the V-shaped pulley groove width. Consequently, the V belt CV-T mechanism 29 decreases the speed ratio (reduction ratio) by increasing the effective V belt contact radius of the driver pulley 16 and decreasing the effective V belt contact radius of the follower pulley 26. When the spool 106g is moved downwards in FIG. 2, then the speed ratio (reduction ratio) is increased.

The shift: operating mechanism 112 has the lever 178 having a middle portion connected by the pin 181 with the upper end of the spool 106g of the shift control valve 106. The lever 178 has a first lever end connected with a sensor shoe 164 by a combination of a pin 183 and an elongate hole (not shown), and a second lever end connected by a pin 185 with a translational mechanism for converting rotation motion of the stepper motor 108 to translational motion. The sensor shoe 164 is slidably mounted on a guide shaft 162 having a rectangular cross sectional shape and extending in parallel to the rotation axis 14 of the driver pulley 16. The sensor shoe 164 has an outward flange 164a engaging in a groove 22a formed in the outer periphery of the movable disk 22 of the driver pulley 16 so that the sensor shoe 164 moves in conjunction with the axial movement of the movable pulley disk 22.

Figure 4:
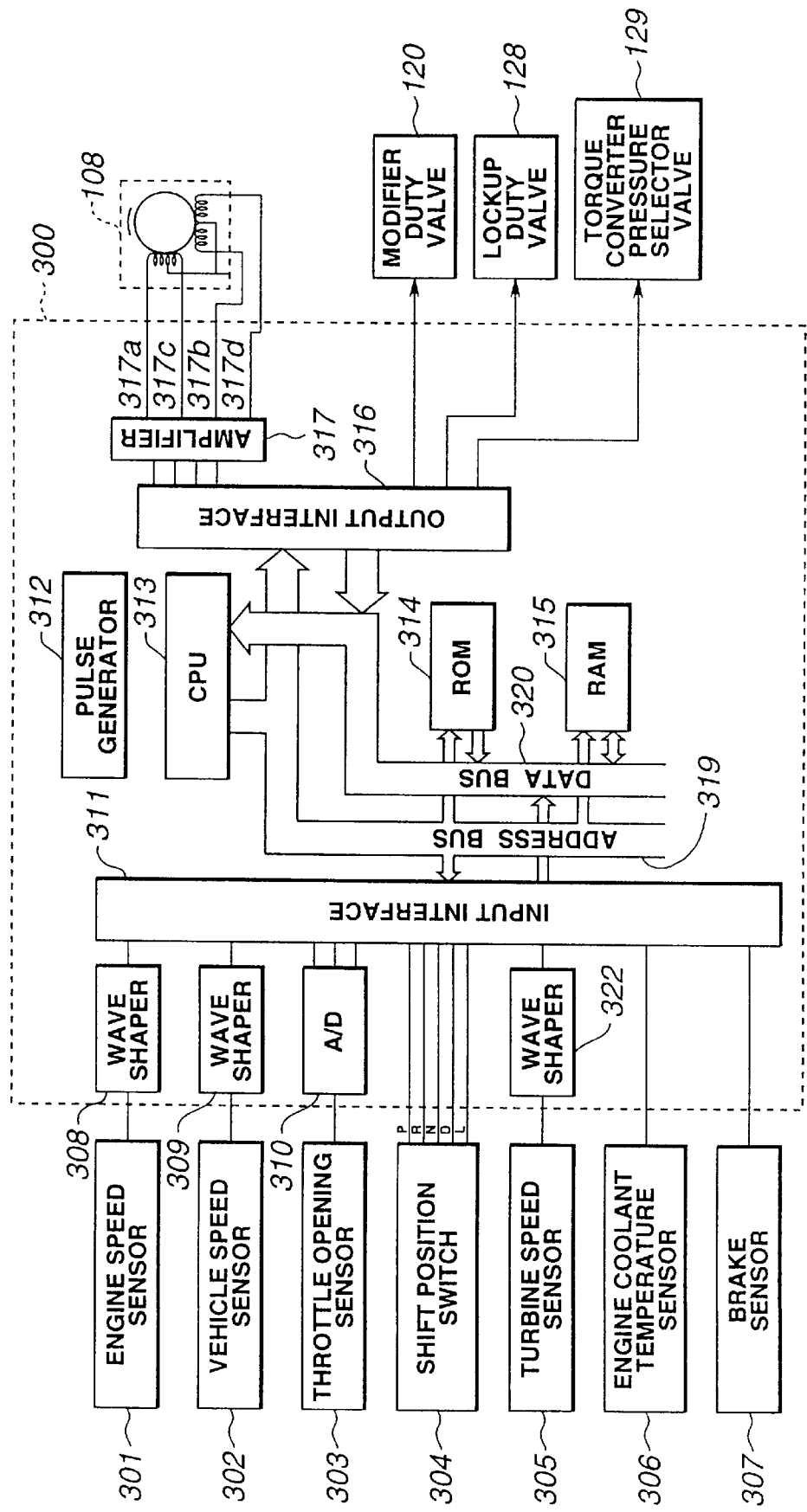
FIG. 4 is a block diagram showing sensors and a shift control unit for supplying control signals to the hydraulic system of FIG. 2.

The lever 178 rotates about the pin 183 in the clockwise direction and pushes the spool 106g of the shift control valve 106 downwards when the stepper motor 108 is rotated in the clockwise direction under the control of the shift control unit 300 shown in FIG. 4. Therefore, the fluid pressure in the driver pulley cylinder chamber 20 becomes lower by drainage of the fluid from the driver pulley cylinder chamber 20 through the drain port 106c and the lubricating systems. With the lowering of the pressure in the driver pulley chamber 20, the belt 24 sinks deeper into the groove and increasing the groove width of the driver pulley 16 by pushing the movable disk 22 upwards in FIG. 2 away from the fixed disk 18. Simultaneously, the follower pulley 26 decreases its groove width (by receiving the supply of the sufficiently high line pressure P$_L$). Thus, the input/output speed ratio corresponding to the vehicle reduction ratio is increased. With the upward movement of the movable disk 22, the sensor shoe 164 moves upward in FIG. 2, and causes the lever 178 to rotate about the pin 185 in the clockwise direction because of the connection by the pin 183 between the first end of the lever 178 and the sensor shoe 164. Therefore, the spool 106g is pulled back upward to the position closing the outlet port 106b with the land 106e, and stops the movable disk 22 of the driver pulley 16. In this way, the spool 106g, the driver pulley 16 and the follower pulley 26 settle into a stable state providing a desired speed ratio corresponding to a rotational position of the stepper motor 108.

When the stepper motor 18 is rotated in the counterclockwise direction, the spool 106g of the shift control valve 106 moves upward in FIG. 2 to the state to supply the line pressure to the driver pulley cylinder chamber 20. Therefore, the V belt CVT mechanism 29 decreases the speed (reduction) ratio by decreasing the V-shaped groove width of the driver pulley 16 and increasing the V-shaped groove width of the follower pulley 24. In this case, the follower pulley 24 increases its groove width because of a reduction of the supplied line pressure. As mentioned before, the cylinder chambers 20 and 32 of the driver and follower pulleys 16 and 24 are so designed that, for a given magnitude of the line pressure, the thrust of the driver pulley cylinder chamber 20 is about twice as large as the thrust of the follower pulley cylinder chambers 32. Therefore, the driver pulley 16 can decrease the groove width notwithstanding the lowering of the line pressure. After this movement to decrease the speed ratio, the spool 106g is forced back downward by the downward movement of the sensor shoe 164 caused by the downward movement of the movable disk 22, to the state closing the outlet port 106b with the land 106e and thereby stops the movable disk 22. In this way, the spool 106g, the driver pulley 16 and the follower pulley 26 settle into a stable state providing the desired speed ratio corresponding to the rotational position of the stepper motor 108.

In this way, the control system can vary the speed ratio of the CVT mechanism 29 by controlling the stepper motor 108. The shift control unit 300 controls the stepper motor 108 by sending a stepper motor drive signal in the form of a pulse signal. The shift control unit 300 can determine the rotational angle of the stepper motor 108 to obtain a desired speed ratio by producing the drive signal in accordance with a predetermined shift pattern.

The shift control unit 300 receives electric signals from a sensor group, and controls the stepper motor 108, modifier duty valve 120, lockup duty valve 128 and torque converter pressure selector valve 129.

As shown in FIG. 4, the sensor group of this example includes an engine rotational speed sensor 301, a vehicle speed sensor 302, a throttle opening sensor 303, a shift position switch 304, a turbine rotational speed sensor 305, an engine coolant temperature sensor 306 and a brake sensor 307. The engine speed sensor 301 senses the engine rotational speed from the ignition spark pulses, for example. The vehicle speed sensor 302 senses the vehicle speed from the rotation of the output shaft of the continuously variable transmission. The throttle opening sensor 303 senses the throttle opening (degree) of the engine in the form of a voltage signal. The shift position switch 304 senses the selected position of the select lever and delivers a signal from which the control unit 300 can discriminate among the P, R, N, D and L positions of the select lever. The turbine speed sensor 305 senses the rotational speed of the turbine shaft of the torque converter 12. The engine coolant temperature sensor 306 is arranged to produce a signal when the temperature of the engine cooling water is equal to or lower than a predetermined value. The brake sensor 307 detects whether the brake of the vehicle is applied or not.

The signals from the engine speed sensor 301, vehicle speed sensor 302 and turbine speed sensor 305 are supplied, respectively, through wave shaping circuits 308, 309 and 322, to an input interface 311 of the control unit 300. An A/D converter 310 converts the voltage signal of the throttle opening sensor 303 into a digital signal and supplies this digital signal to the input interface 311. In this example, the digital signal represents the throttle opening in the form of 0/8~8/8.

The shift control unit 300 of this example includes at least the input interface 311, a CPU (central processing unit) 313, a reference pulse generator 312, a ROM 314, a RAM 315, and an output interface 316. These sections are connected by address bus 319 and data bus 320. The reference pulse generator 312 produce a reference pulse signal for operating the CPU 313. The ROM 314 stores programs and required data for controlling the stepper motor 108, duty valves 120 and 128 and selector valve 129. The RAM 315 temporarily stores information from the sensor group and various parameters or variables.

An output signal of the shift control unit 300 is delivered through an amplifier 317 to the stepper motor 108. The other output signals are directly supplied, respectively, to the electromagnetic solenoids of the duty valves 120 and 128 and the converter pressure selector valve 129.

Figure 5A:
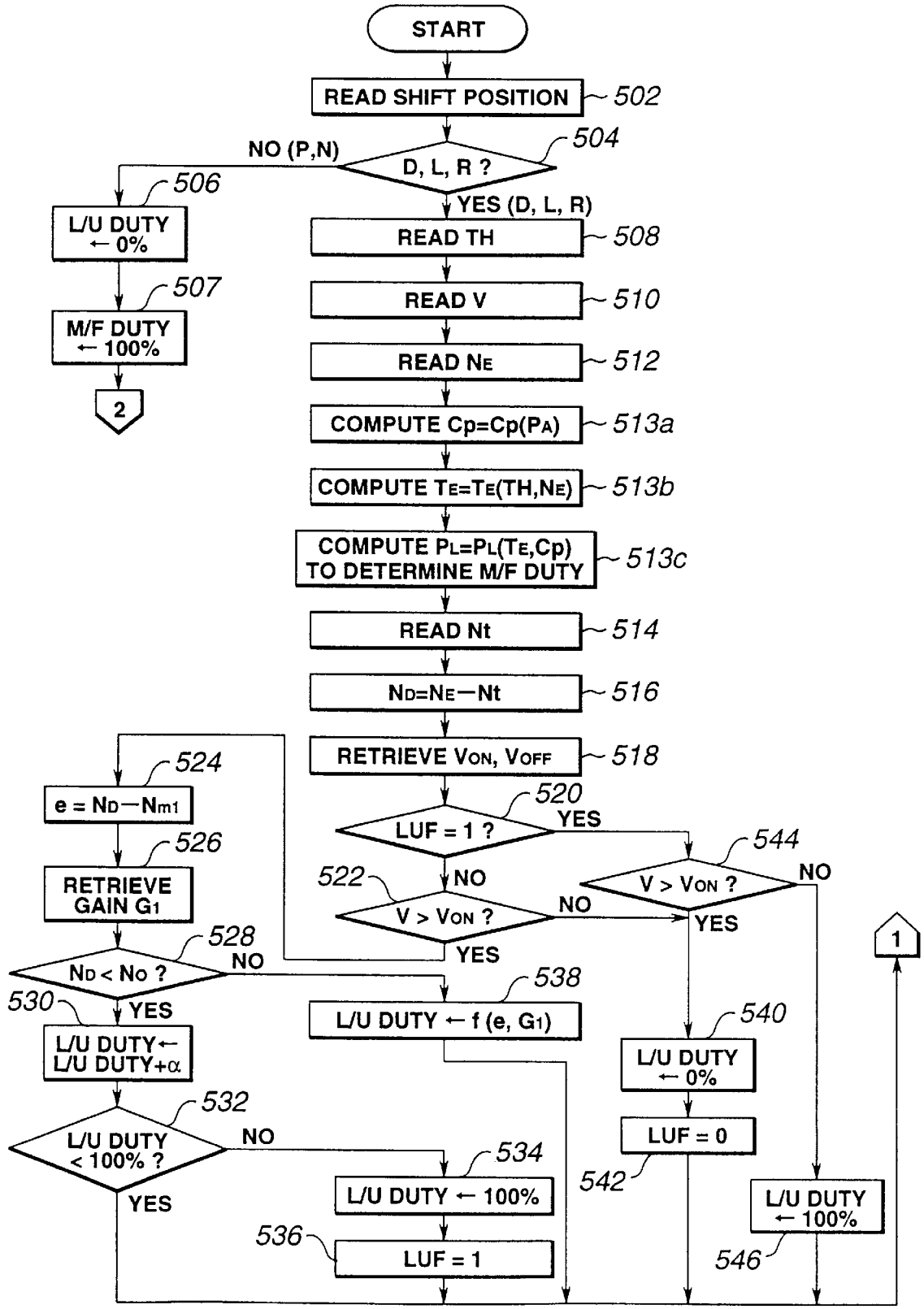
FIGS. 5A and 5B are flow charts showing a shift control program performed by the shift control unit of FIG. 4.
Figure 5B:
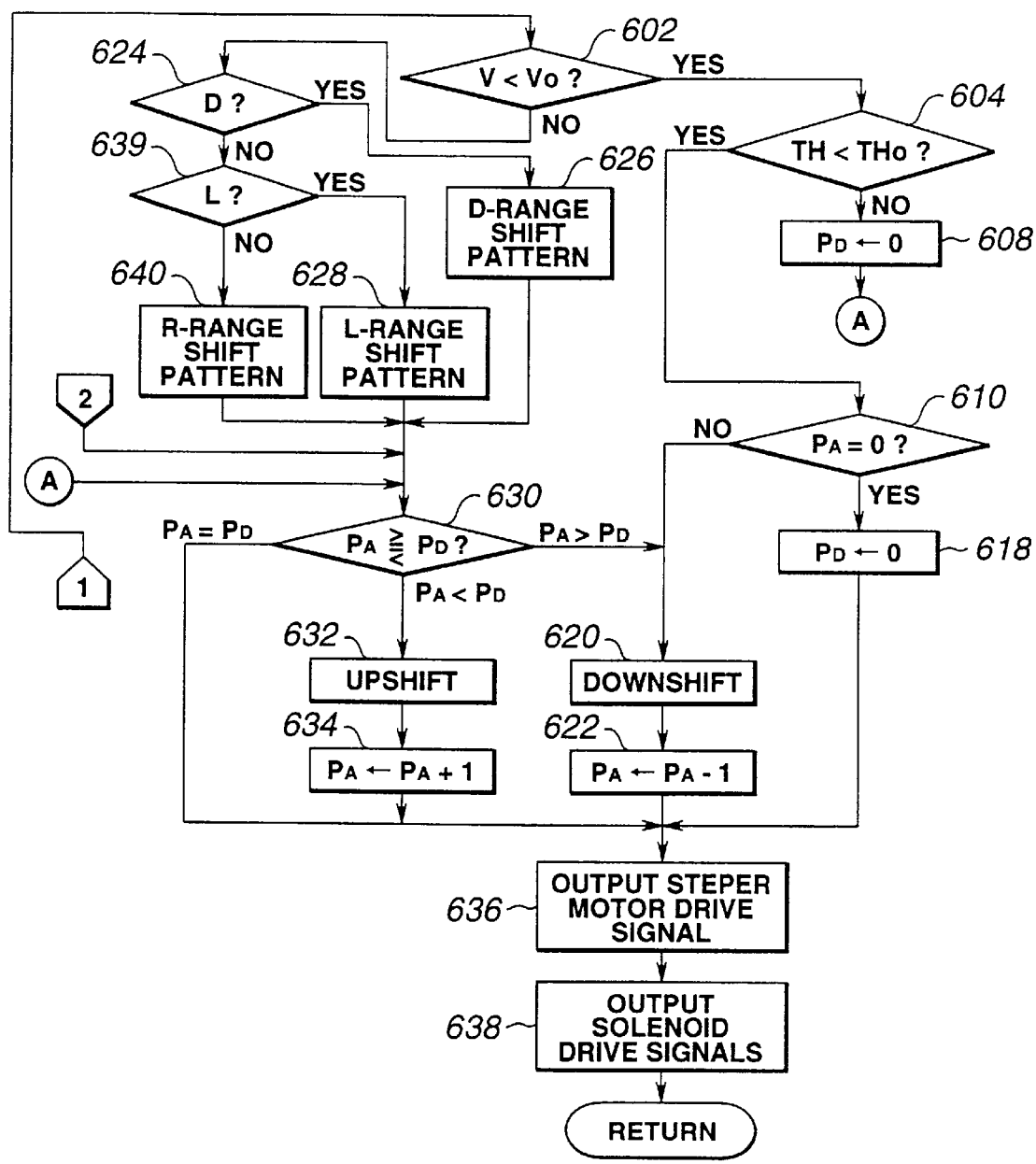

FIGS. 5A and 5B show a speed ratio control process performed by the shift control unit 300. This control process is basically the same as the control process disclosed in the before-mentioned Japanese Publication No. 7-259941, but there are some differences in the details. The control unit 300 performs the control process of FIGS. 5A and 5B by a timer interrupt scheme at intervals of a predetermined sampling time ΔT. The control process includes the following step. Each step performs one or more operations as explained below. That is, each step specifies one or more operations and causes the control unit 300 or the CPU 313 to perform the specified operations.

A step 502 reads (or specifies an operation to read, to be exact) the shift position sensed by the shift position switch 304. A decision step 504 determines whether or not the shift position is in one of the driving ranges, the D, L and R ranges. When the shift position is in any one of the D, L and R ranges, the CPU 313 proceeds to a step 508.

When the selected shift position is in the P range or the N range, the CPU 313 proceeds to a step 506, and sets a lockup duty ratio (L/U DUTY) to zero at the step 506. The lockup duty ratio is a duty ratio (or duty factor) of an exciting current for the electromagnetic solenoid of the lockup duty valve 128. Then, the CPU 313 sets a modifier duty ratio (M/F DUTY) to 100 at a next step 507, and thereafter proceeds to a step 630. The modifier duty ratio is a duty ratio (or duty factor) of an exciting current for the electromagnetic solenoid of the modifier duty valve 120.

In the case of the D, L or R range, the CPU 313 reads the throttle opening (degree) TH sensed by the throttle opening sensor 303 at the step 508, the vehicle speed V sensed by the vehicle speed sensor 302 at a step 510, and the engine speed $N_E$ sensed by the engine speed sensor 305 at a step 512, and then proceeds to a step 513a.

Figure 6:
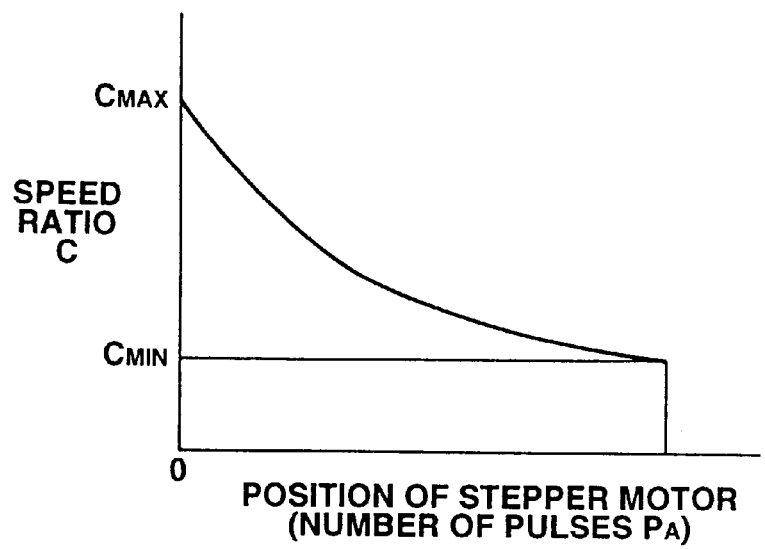
FIG. 6 is a graph showing a relationship between the speed ratio (reduction ratio) of a CVT mechanism of the power transmission system of FIG. 1 and a step position of a stepper motor shown in FIGS. 2 and 4.

The step 513a calculates a current speed ratio $C_P$ by using a map as shown in FIG. 6 in accordance with a current pulse count $P_A$ which is a number of pulses of the stepper motor 108 stored in the RAM 315.

Figure 7:
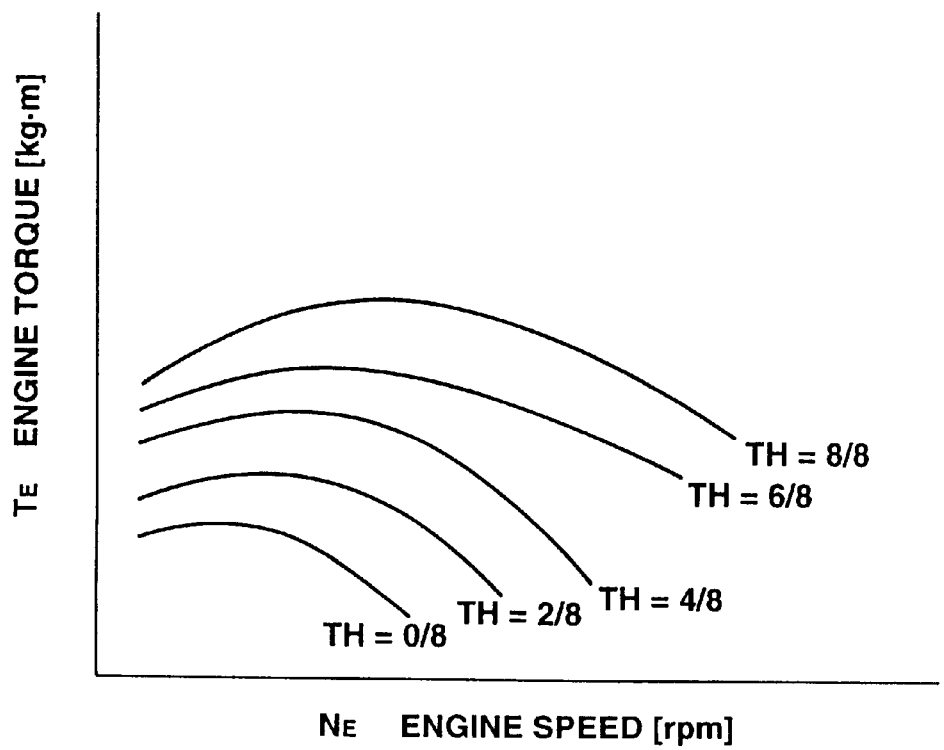
FIG. 7 is a graph showing a relation between an engine torque and an engine speed, used in the control process of FIGS. 5A and 5B.

A next step 513b calculates an engine torque $T_E$ from the throttle opening TH and the engine speed $N_E$ by using a map of FIG. 7 of a relationship between the engine torque $T_E$ and the engine speed $N_E$ with the throttle opening as a parameter.

Figure 8:
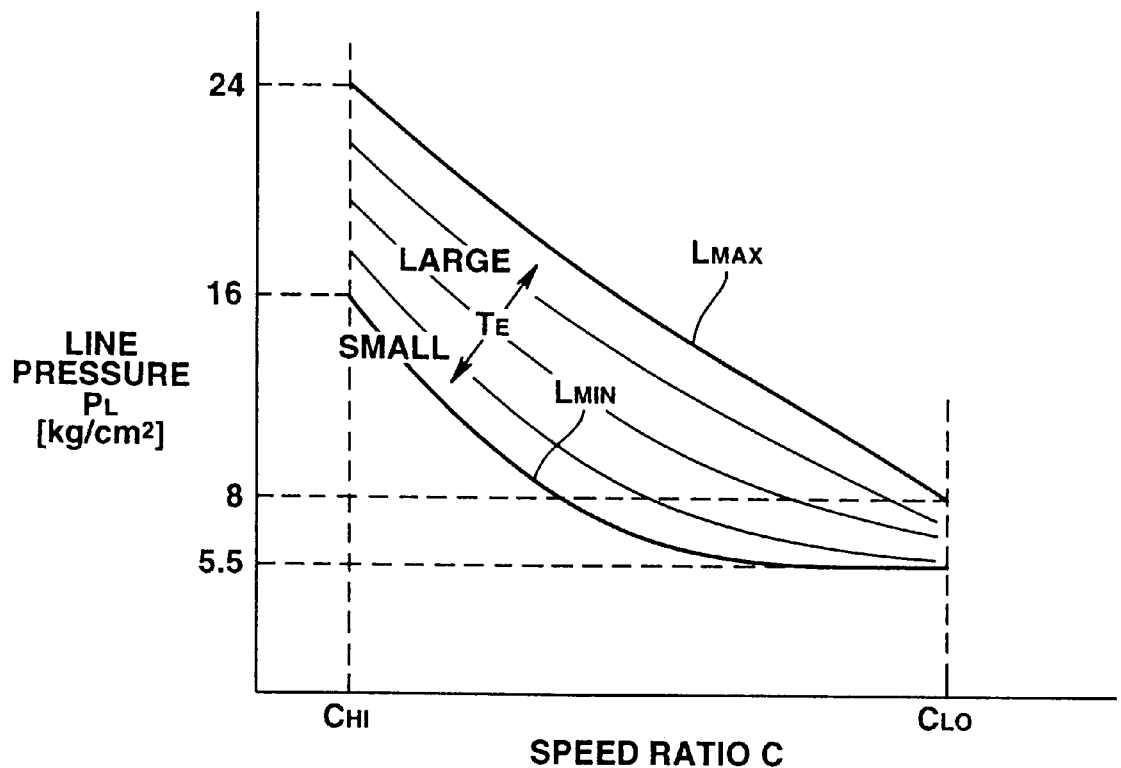
FIG. 8 is a graph showing a relation between a line pressure and the speed ratio (reduction ratio), used in the control process of FIGS. 5A and 5B.

A step 513c calculates the line pressure $P_L$ from the calculated engine torque $T_E$ and the current speed ratio $C_p$ by using a map of FIG. 8 of a relationship between the speed ratio $C_p$ and the line pressure $P_L$ with the engine torque $T_E$ as a parameter. Then, the CPU 313 determines the modifier duty ratio required to achieve the thus-calculated line pressure $P_L$, and thereafter proceeds to a step 514. Therefore, the modifier valve 116 can supply the pilot pressure corresponding to the modifier duty ratio to the line pressure regulating valve 102, which in turn regulates the actual line pressure to the calculated value.

Figure 9:
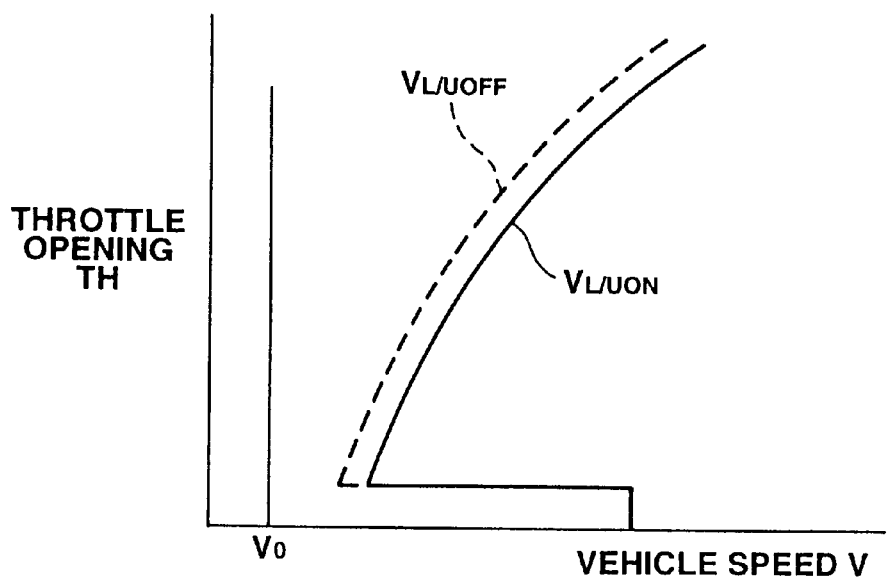
FIG. 9 is a graph showing a characteristic of a lockup vehicle speed used in the control process of FIGS. 5A and 5B.

Then, the CPU 313 reads the turbine speed Nt sensed by the turbine speed sensor 305 at the step 514; calculates a speed difference $N_D$ between the engine speed $N_E$ and the turbine speed Nt at a step 516, and determines a lockup on vehicle speed $V_{L/U\text{-}ON}$ (or $V_{ON}$) and a lockup off vehicle speed $V_{L/U\text{-}OFF}$ (or $V_{OFF}$) in accordance with the throttle opening TH and the vehicle speed V at a step 518 by information retrieval using a control map of FIG. 9 stored in the ROM 314. Then, at a step 520, the CPU 313 determines whether a lockup flag LUF is set to one or not. The CPU 313 proceeds to a step 544 if the lockup flag LUF is one, and to a step 522 if it is not. The decision step 544 determines whether or not the vehicle speed V is lower than the lockup off vehicle speed $V_{L/U\text{-}OFF}$ (or $V_{OFF}$), and proceeds to a step 540 if V< $V_{L/U\text{-}OFF}$, and to a step 546 if V is equal to or higher than $V_{L/U\text{-}OFF}$. In the case of the lockup flag LUF being zero, the CPU 313 determines whether the vehicle speed V is higher than the lockup on vehicle speed $V_{L/U\text{-}ON}$ at the step 522, and proceeds to a step 524 if the vehicle speed V is higher than the lockup on speed $V_{L/U\text{-}ON}$, and to the step 540 if the vehicle speed V is equal to or lower than the lockup on speed $V_{L/U\text{-}ON}$.

The step 524 calculates a desired speed difference e by subtracting a first desired value Nm1 from the speed difference $N_D$. Then, the CPU 313 retrieves a first feedback gain G1 corresponding to the desired speed difference e from a preliminarily stored control map at a step 526. A next step 528 is to compare whether the speed difference $N_D$ is smaller than a control mode switching threshold value $N_0$ or not. The step 528 transfers control to a step 530 if $N_D<N_0$, and to a step 538 if $N_D$ is equal to or greater than $N_0$ ($N_D \geq N_0$). The step 530 determines a current lockup duty ratio by adding a small predetermined value α (alpha) to a previous lockup duty ratio. A next step 532 checks whether the thus-determined lockup duty ratio is lower than 100% or not, and transfers control to a step 602 if it is lower than 100% and to a step 534 if it is not. The step 534 sets the current lockup duty ratio equal to 100%, and a next step 536 sets the lockup flag LUF to one and transfers control to the step 602. The step 538 calculates the current value of the lockup duty ratio in accordance with the desired speed difference e and the first feedback gain G1 by using a mathematical equation including e and G1 as variables, and then transfers control to the step 602. The step 540 sets the current value of the lockup duty ratio to 0%, and a next step 542 resets the lockup flag LUF to zero and proceeds to the step 602. The step 546 sets the current lockup duty ratio to 100% and proceeds to the step 602.

The step 602 is a decision step to determine whether the vehicle speed V is lower than a predetermined shift control initiating threshold vehicle speed $V_0$, which, in this example, is in a range of 2~3 km/h, and is lower than each of $V_{L/U\text{-}ON}$ and $V_{L/U\text{-}OFF}$ as shown in FIG. 9. If $V< V_0$, then the CPU 313 recognizes the necessity for setting the speed ratio C to the maximum ratio, and proceeds to a step 604. If V is equal to or higher than $V_0$ ($V \geq V_0$), the CPU 313 recognizes the necessity for carrying out the shift control operation, and proceeds to a step 624. The step 604 determines whether the throttle opening TH is smaller than an idle discriminating threshold valve $TH_0$, or not. The CPU 313 proceeds to a step 610 if $TH<TH_0$, and to a step 608 if TH is equal to or greater than $TH_0$ ($TH \geq TH_0$). The step 608 sets a desired pulse count $P_D$ for the stepper motor 108 to zero, and proceeds to the step 630 for comparison between $P_A$ and $P_D$. The step 610 determines whether the current actual pulse count $P_A$ is equal to zero, or not. The CPU 313 proceeds to a step 618 if $P_A=0$, and to a step 620 if $P_A$ is nonzero. The step 618 sets the current pulse count $P_A$ for the stepper motor 108 to zero, and transfer control to a step 636.

The step 624 determines whether the shift position is in the D range. In the case of the D range, the CPU 313 proceeds from the step 624 to a step 626 and determines the speed ratio in accordance with the vehicle speed V and the throttle opening TH by retrieval using a preliminarily stored D range shift pattern. Thereafter, the CPU 313 proceeds from the step 624 to the 630.

A step 639 is reached if the step 624 provides the negative answer that the shift position is not in the D range. The step 639 determines whether the shift position is in the L range. In the case of the L range, the CPU 313 determines, at a step 628, the speed ratio in accordance with the vehicle speed V and the throttle opening TH by retrieval using a preliminarily stored L range shift pattern, and then proceeds to the step 630. If the shift position is not in the L range, the CPU 313 proceeds to a step 640 for the R range, determines the speed ratio in accordance with the vehicle speed V and the throttle opening TH by retrieval using a preliminarily stored R range shift pattern, and then proceeds to the step 630.

The step 630 compares the current actual pulse count $P_A$ of the stepper motor 108, with the desired pulse count $P_D$. From the step 630, the CPU 313 proceeds to the step 636 if $P_A=P_D$, to a step 632 if $P_A<P_D$, and to the step 620 if $P_A>P_D$. In the case of $P_A$ being smaller than $P_D$, the step 632 is executed to determine to vary the stepper motor drive signal in the upshift direction by a predetermined amount (or a predetermined number of steps). The next step 634 updates the actual current pulse count $P_A$ by increasing the actual pulse count $P_A$ by one, and then transfers control to the step 636. In the case of $P_A$ being greater than $P_D$, the step 620 is executed to determine to vary the stepper motor drive signal in the downshift direction by a predetermined amount (or a predetermined number of steps). The next step 622 updates the actual current pulse count $P_A$ by decreasing the actual pulse count $P_A$ by one, and then transfers control to the step 636. The CPU 313 outputs the stepper motor drive signal at the step 636, then outputs the solenoid drive signals at a step 638, and returns to the main program.

Figure 10:
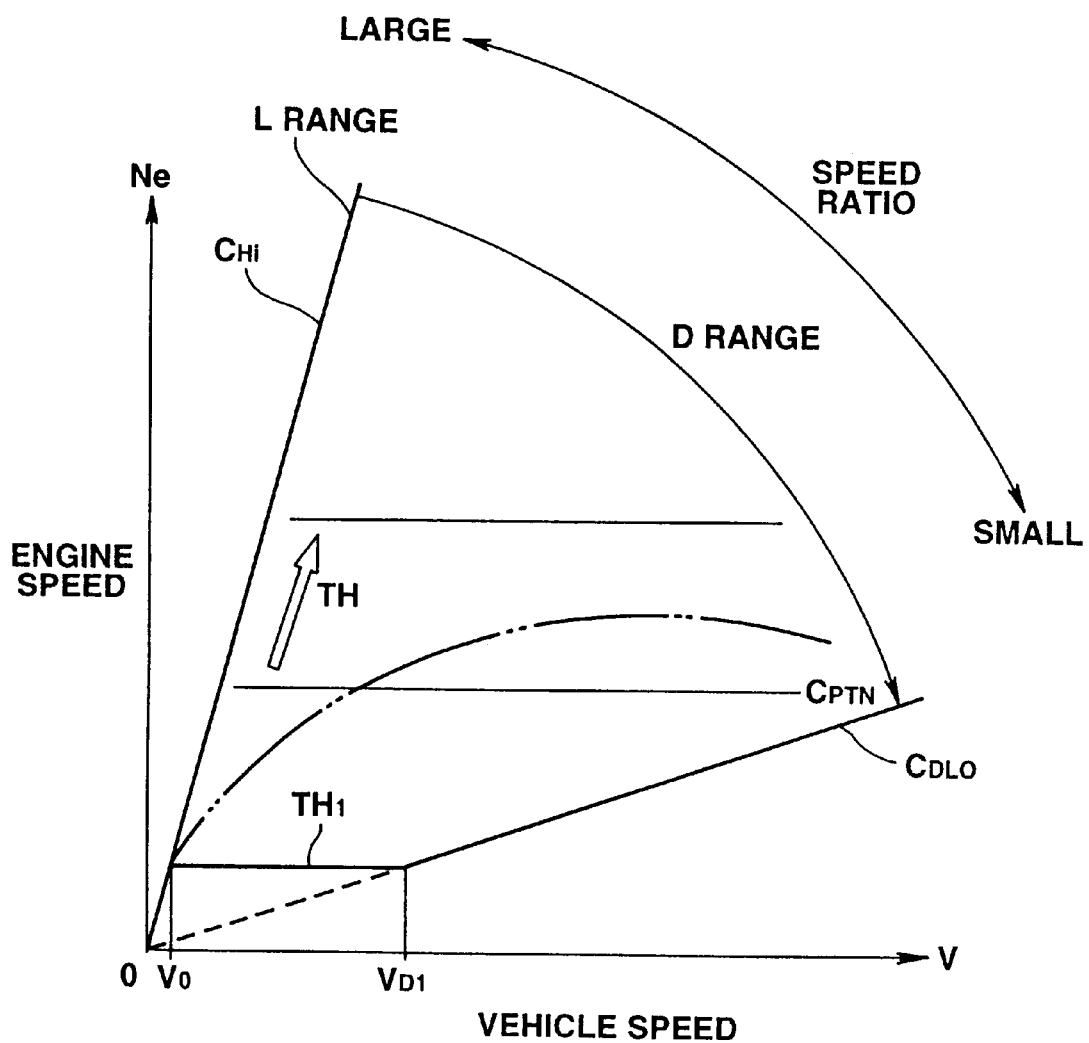
FIG. 10 is a graph showing a shift pattern according to the control process of FIGS. 5A and 5B.

In this example, excluding the shift pattern of the R range, the shift patterns of the D and L ranges used in the steps 626 and 628 are approximately in the form of a shift pattern shown in FIG. 10. In each shift pattern, the CPU 313 can uniquely determine the input/output speed ratio by retrieving a speed ratio value corresponding to the vehicle speed V and the throttle opening TH from the control map having the vehicle speed V and throttle opening TH as arguments. When the shift pattern of FIG. 10 is considered to be a total control map of a shift pattern in which the vehicle speed V is expressed along the horizontal axis, the engine speed $N_E$ along the vertical axis, and the throttle opening TH is a parameter, then the speed ratio is regarded as constant along a straight line having a constant slope and passing through the origin. a steepest straight line passing through the origin and having the greatest slope represents a maximum speed ratio $C_{Hi}$ corresponding to a maximum overall speed reduction ratio of the vehicle. A most gradual straight line passing through the origin and having a smallest slope represents a D range minimum speed ratio $C_{DLO}$ corresponding to a minimum overall reduction ratio of the vehicle. The shift pattern of the L range is fixed at the maximum speed ratio $C_{Hi}$ independently of the vehicle speed V and the throttle opening TH. In the shift pattern of the D range, the speed ratio varies with time along a control curve in dependence on the vehicle speed V and the throttle opening TH, in the region between the maximum speed ratio $C_{Hi}$ and the D range minimum speed ratio $C_{DLO}$. In a normal accelerating operation, for example, the speed ratio is controlled along a two dot chain line curve in FIG. 10.

Figure 11:
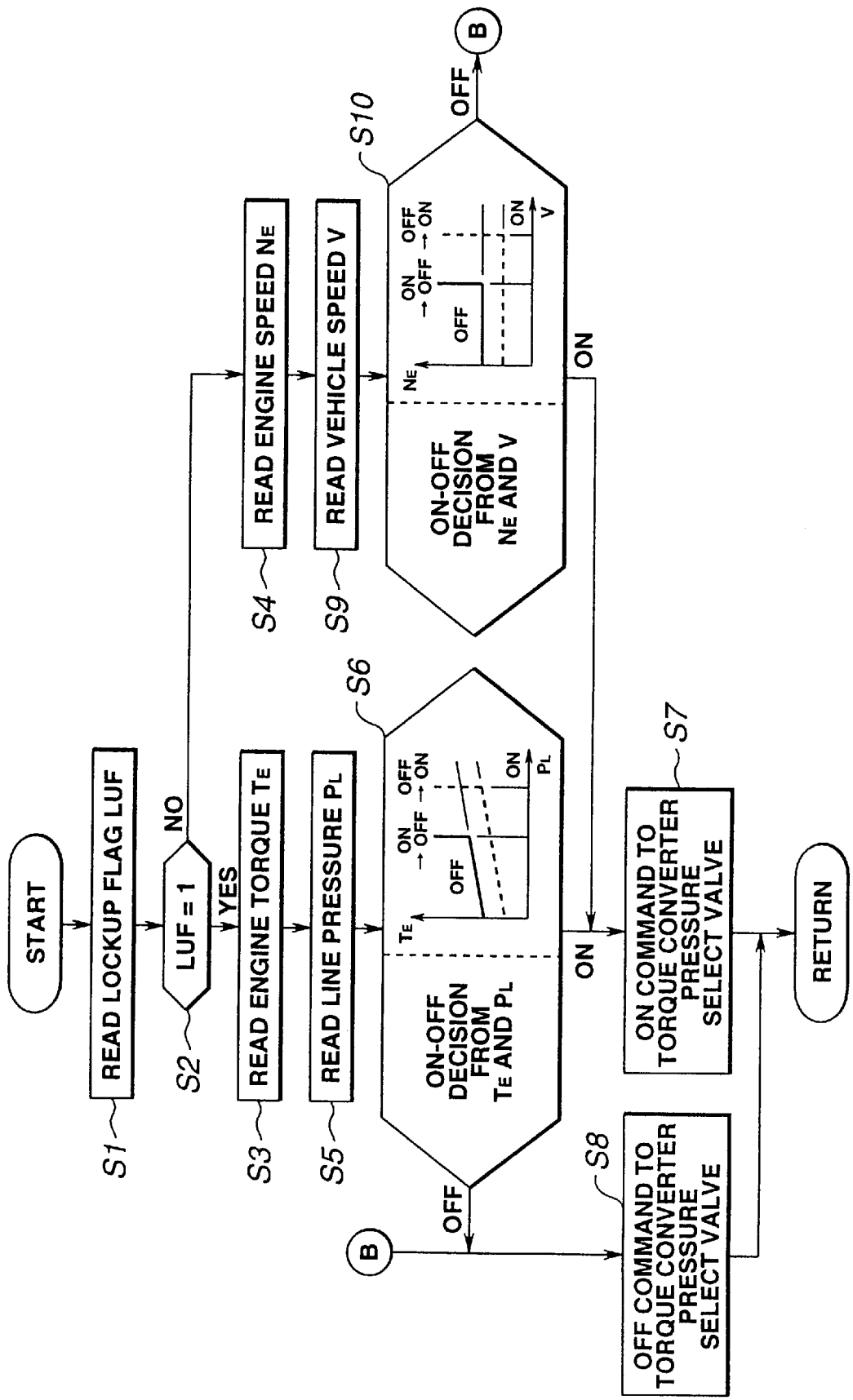
FIG. 11 is a flow chart showing a torque converter pressure selecting process performed by the control unit of FIG. 4.

FIG. 11 shows a torque converter pressure selecting control process performed by the CPU 313 of the shift control unit 300. This control process is performed by the timer interrupt at intervals of the predetermined sampling time ΔT like the process of FIGS. 5A and 5B.

A step S1 reads the lockup flag LUF. That is, the CPU 313 reads the lockup flag LUF set by the control process of FIGS. 5A and 5B and stored in the RAM 315.

Then, the CPU 313 proceeds to a step S2, and determines whether the torque converter 12 is in the lockup state by examining whether the lockup flag LUF is equal to one. The CPU 313 proceeds to a step S3 if LUF is set to one and to a step S4 if LUF is not one.

In the case of LUF being one, the CPU 313 reads the engine torque $T_E$ calculated by the control process of FIGS. 5A and 5B and stored in the RAM 315, at the step S3; further reads, at a step S5, the line pressure $P_L$ calculated by the control process of FIGS. 5A and 5B and stored in the RAM 315; and then proceeds to a step S6.

Figure 12A:
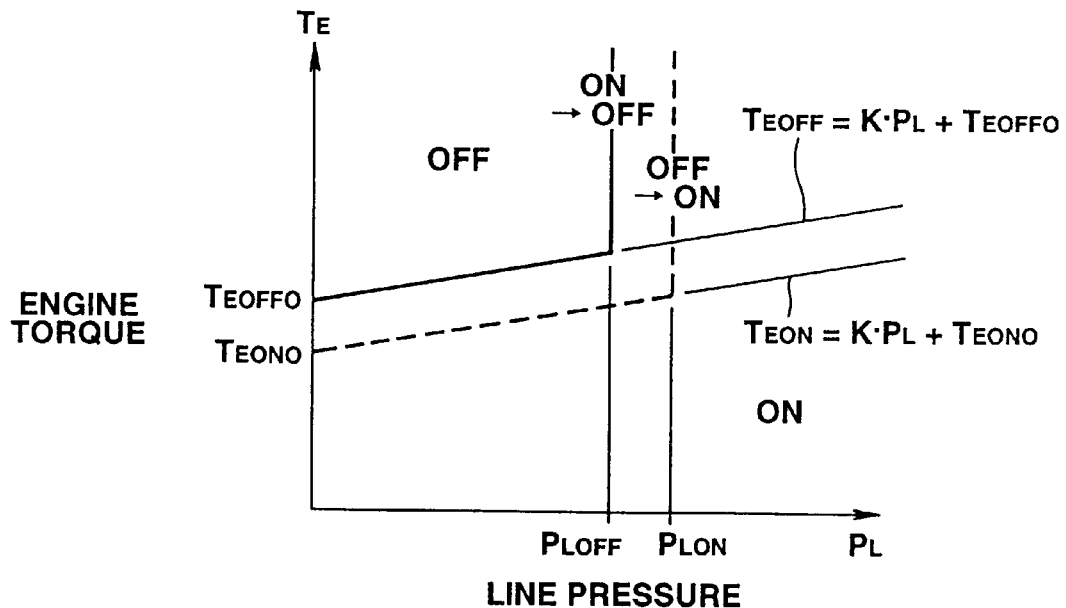
FIG. 12A is a graph showing a lockup time on-off control map responsive to the line pressure and engine torque, used in the selecting process of FIG. 11 when the torque converter is in the lockup state.

At the step S6, the CPU 313 determines whether to turn on or off the torque converter pressure selecting valve 129, in accordance with the engine torque $T_E$ and the line pressure $P_L$ obtained at the steps S3 and S5, by using a control map shown in FIG. 12A. From the step S6, the CPU 313 proceeds to a step S7 if the selector valve 129 is to be turned on, and to a step S8 if the selector valve 129 is to be turned off.

In the case of LUF being zero, the CPU 313 reads, at the step S4, the engine speed N$_E$ sensed by the engine speed sensor 301; further reads the vehicle speed V from the vehicle speed sensor 302 at a step S9; and then proceeds to a step S10.

Figure 12B:
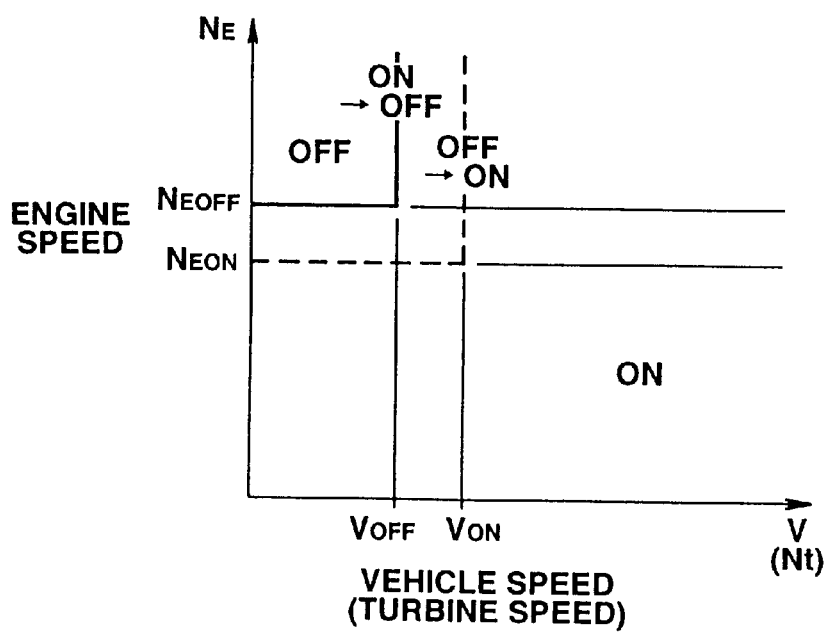
FIG. 12B is a graph showing a non-lockup time on-off control map responsive to the vehicle speed and engine speed, used in the selecting process of FIG. 11 when the torque converter is out of the lockup state.

At the step S10, the CPU 313 uses a control map shown in FIG. 12B and thereby determines whether to turn on or off the torque converter pressure selecting valve 129, in accordance with the engine speed N$_E$ and the vehicle speed V. From the step S10, the CPU 313 proceeds to the step S7 if the selector valve 129 is to be turned on, and to the step S8 if the selector valve 129 is to be turned off.

The CPU 313 outputs the ON command signal to the torque converter pressure selector valve 129 at the step S7 and then returns to the main program. Alternatively, the CPU 313 outputs the OFF command signal to the selector valve 129 at the step 58 and then returns to the main program.

FIG. 12A shows the on-off control map for the lockup period. The horizontal axis of FIG. 12A represents the set line pressure P$_L$, and the vertical axis the engine torque T$_E$. The torque converter pressure P$_{T/C}$ increases as the line pressure P$_L$ increases. An OFF line pressure P$_{LOFF}$ is a predetermined value of the line pressure P$_L$ at which the torque converter pressure P$_{T/C}$ is high enough to maintain the lockup state of the torque converter 12 in the high output high speed vehicle operation. An ON line pressure P$_{LON}$ is greater than the OFF line pressure P$_{LOFF}$ by a predetermined amount to induce hysteresis for preventing undesired control hunting. The control map of FIG. 12A has two parallel inclined torque lines. One is an OFF engine torque line T$_{EOFF}$ and the other is an ON engine torque line T$_{EON}$. As the line pressure P$_L$ increases, the OFF engine torque line T$_{EOFF}$ (=K·P$_L$+T$_{EOFFO}$) slopes upwards with a predetermined slope (or gain) K from an OFF engine torque intercept T$_{EOFFO}$ corresponding to a value of the engine torque in the high output high speed operation when the line pressure P$_L$ is zero. Similarly, the ON engine torque line T$_{EON}$ (=K·P$_L$+T$_{EONO}$) slopes upwards with the same slope (or gain) K from an ON engine torque intercept T$_{EONO}$. The ON engine torque intercept T$_{EONO}$ is smaller than the OFF engine torque intercept T$_{EOFFO}$ by a predetermined amount to produce hysteresis for preventing undesired control hunting. When the selector valve 129 is ON, this control system turns the selector valve 129 from ON to OFF if the line pressure P$_L$ becomes equal to or lower than the OFF line pressure P$_{LOFF}$ and at the same time the engine torque T$_E$ becomes equal to or greater than the OFF engine torque line T$_{EOFF}$. When the selector valve 129 is OFF, the control system turns the selector valve 129 from OFF to ON if the line pressure P$_L$ becomes equal to or higher than the ON line pressure P$_{LON}$ and at the same time the engine torque T$_E$ becomes equal to or smaller than the ON engine torque line T$_{EON}$. It is optional to replace this control map by a simple control process using a flag indicating the ON or OFF state of the selector valve 129 and operations for comparing the line pressure P$_L$ and the engine torque T$_E$ with respective threshold values.

FIG. 12B shows the on-off control map for the non-lockup period. The horizontal axis of FIG. 12B represents the vehicle speed V, and the vertical axis the engine speed N$_E$. An OFF vehicle speed V$_{OFF}$ is a predetermined threshold value of the vehicle speed V to discriminate the stall start condition. An ON vehicle speed V$_{ON}$ is greater than the OFF vehicle speed V$_{OFF}$ by a predetermined amount to induce hysteresis. An OFF engine speed N$_{EOFF}$ is a predetermined threshold value of the engine speed N$_E$ to discriminate the stall start condition. An ON engine speed N$_{EON}$ is smaller than the OFF engine speed N$_{EOFF}$ by a predetermined amount to induce hysteresis. This control system turns the torque converter selector valve 129 from ON to OFF if the vehicle speed V becomes equal to or lower than the OFF vehicle speed V$_{OFF}$ and at the same time the engine speed N$_E$ becomes equal to or greater than the OFF engine speed N$_{EOFF}$. The control system turns the torque converter pressure selector valve 129 from OFF to ON if the vehicle speed V becomes equal to or higher than the ON vehicle speed V$_{ON}$ and at the same time the engine speed N$_E$ becomes equal to or smaller than the ON engine speed N$_{EON}$. It is optional to replace this control map by a simple control process using the flag indicating the ON or OFF state of the selector valve 129 and operations for comparing the vehicle speed V and the engine speed N$_E$ with respective threshold values.

The thus-constructed control system of this example controls the speed (reduction) ratio in the following manner.

When the P range is selected, and the vehicle is in the parking state, the V belt CVT mechanism 29 is in the shift state for providing the maximum speed ratio C$_{Hi}$ with the minimum effective radius of the driver pulley 16 and the maximum effective radius of the follower pulley 26, as shown in FIG. 2. When the ignition switch is turned on and the engine starts idling, the engine-driven pump 101 supplies the pump discharge pressure to the upstream port 102a of the line pressure regulating valve 102 as the input pressure, and to the pilot port 102b as the pilot pressure. From the valve 102, the fluid further flows through the regulating valves 122 and 124 successively, and then to the lubricating systems.

In response to a turn-on of the ignition switch, the CPU 313 first resets the lockup flag LUF to zero, and the desired pulse count P$_D$ to zero for initialization, and then starts carrying out the control process of FIGS. 5A and 5B. Because of the current selection of the P range, the CPU 313 proceeds from the step 504 to the step 506, sets the lockup duty ratio to zero at the step 506 and the modifier duty ratio to 100 at the step 507, and proceeds to the step 630. If P$_A$=P$_D$ (=0), the CPU 313 outputs the motor drive signal to hold the position of the stepper motor 108 unchanged at the step 636, and then outputs the lockup solenoid drive signal of the duty ratio of zero to the lockup duty valve 128, and the modifier solenoid drive signal of 100% duty ratio to the modifier duty valve 120 at the step 638. Then, entering the control process of FIG. 11, the CPU 313 takes the course of the steps S4, S9 and S10 because the lockup flag LUF is still in the reset state of zero. Since the vehicle is in the parking state and the engine is idling, the vehicle speed V is zero, and hence lower than the OFF vehicle speed V$_{OFF}$, and the engine speed NE is lower than the OFF engine speed N$_{EOFF}$. Therefore, the CPU 313 decides to maintain the on state of the torque converter pressure selector valve 129 at the step S10 according to the map of FIG. 12B, and delivers the ON command signal to hold the selector valve 129 in the ON state at the step S7.

In response to the 100% duty ratio drive signal, the modifier duty valve 120 delivers, from the outlet port 120b, the modifier control pressure P$_{L\text{-}SOL}$ at a minimum level to the pilot port 116b of the pressure modifier valve 116. On the other hand, the pilot port 116m of the pressure modifier valve 116 receives the drive pilot pressure P$_{PLT}$ of the constant pressure regulating valve 118 which originates from the clutch pressure and which is higher than the modifier control pressure P$_{L\text{-}SOL}$. Therefore, the thrust resulting from both pilot pressures mainly acts on the pressure decreasing side against the biasing force of the return spring 116h, and the spool 116g moves downwards.

Thus, the pressure modifier valve 116 shuts off its inlet and outlet ports 116d and 116a from each other, connects the outlet port 116a with the drain port 116c, and thereby decreases the pilot pressure P$_L$-PLT to the pilot port 102c of the line pressure regulating valve 102, to zero. In response to this zero pilot pressure P$_L$-PLT, the line pressure regulating valve 102 produces the line pressure P$_L$ at the minimum line pressure level P$_{LMIN}$ on the upstream side of the upstream port 102a. This line pressure is supplied only to the cylinder chamber 32 of the follower pulley 26 of a narrow V groove width because the stepper motor 108 is not driven and the spool 106g of the shift control valve 106 is not moved.

The remainder of the fluid after the line pressure regulating valve 102 is supplied to the upstream port 122a of the clutch pressure regulating valve 122, and the clutch pressure regulating valve 122 produces, on the upstream side of the upstream port 122a, the clutch pressure P$_C$ regulated at the minimum clutch pressure PCMIN in response to the modifier control pressure P$_L$-SOL at the minimum level. This clutch pressure P$_C$ is supplied to the manual valve 104. In the P range, the inlet port 104a of the manual valve 104 is connected to neither the D range port 104c nor the R range port 104b. Therefore, most of the fluid is supplied to the torque converter pressure regulating valve 124 or drained.

After the clutch pressure regulating valve 122, the fluid is supplied to the upstream port 124a of the converter pressure regulating valve 124. On the other hand, the converter pressure selector valve 129 inhibits the drainage of the converter drive pilot pressure P$_{T/C}$-PLT in response to the ON command signal, and directly supplies the converter drive pilot pressure P$_{T/C}$-PLT to the pilot port 124f of the converter pressure regulating valve 124. Therefore, by the pressure regulating function when the converter pressure selector valve 129 is in the ON state, and the modifier control pressure P$_L$-SOL is at the minimum level, the converter pressure regulating valve 124 produces, on the upstream side, the torque converter pressure P$_{T/C}$ regulated at the ON period minimum level P$_{T/CMIN}$-ON, and supplies this converter pressure to the lockup control valve 126. In this case, the lockup control valve 126 connects the inlet port 126b and the release side outlet port 126c because of the lockup control pressure P$_L$/U-SOL from the lockup duty valve 128 being zero, and supplies the converter pressure P$_{T/C}$ to the release side chamber 12h, so that the torque converter 12 is held in the non-lockup state. Although the lubrication inlet and outlet ports 126f and 126e are disconnected, the fluid from the apply side chamber 12g of the torque converter 12 is supplied to the lubricating systems from the apply side outlet port 126d through the lubrication outlet port 126e.

When the select lever is shifted from the P range to the D range with the brake pedal remaining depressed, the CPU 313 proceeds from the step 504 to the step 508 to initiate the shift control process, and determines the modifier duty ratio from the calculated line pressure P$_L$ at the step 513c. In the idling operation in which the engine speed N$_E$ is low, and the throttle opening is 0/8, the engine torque T$_E$ calculated at the step 513b is small. Therefore, even when the current speed ratio C$_P$ is equal to the maximum speed ratio C$_{Hi}$, the line pressure P$_L$ set at the step 513b is as low as the pressure of the minimum line pressure curve L$_{MIN}$ at the maximum speed ratio C$_{Hi}$ in FIG. 8. Consequently, the modifier duty ratio for the modifier duty valve 128 becomes relatively large, and the modifier duty valve 120 increases the modifier control pressure P$_L$-SOL slightly. In response to this, the pressure modifier valve 116 supplies the modifier pilot pressure P$_L$-PLT of a relatively low pressure level to the pilot port 102c of the line pressure regulating valve 102 by shutting off the outlet port 116a and the drain port 116c more or less and instead connecting the outlet port 116a with the inlet port 116d more or less. In the line pressure regulating valve 102, the spool 102s moves leftward and sets the line pressure P$_L$ at the minimum pressure level at the maximum speed ratio C$_{Hi}$ as shown in FIG. 8.

By receiving the modifier control pressure P$_L$-SOL of a slightly high level, the clutch pressure regulating valve 122 supplies the clutch pressure P$_C$ of a correspondingly high level to the manual valve 104. The manual valve 104 connects the inlet and outlet ports 104a and 104c in the D range, and engages the forward clutch 40 by supplying this clutch pressure P$_C$ through the orifice 142c to the forward clutch 40.

In the control process of FIGS. 5A and 5B, the CPU 313 proceeds from the step 520 to the step 522 because of the lockup flag LUF remaining in the initial reset state, further proceeds to the step 540 because of the vehicle speed V being zero, sets the lockup duty ratio to 0, resets the lockup flag LUF to zero, and proceeds to the step 602. From the step 602, the CPU proceeds to the step 604 because of the vehicle speed V in the parking state being smaller than the preset speed V$_0$, further proceeds to the step 610 because of the throttle opening TH in the idling state being smaller than the preset value TH$_0$, further proceeds to the step 618 because of the current pulse count P$_A$ is still zero, and updates P$_A$ to zero. In the control process of FIG. 11, the CPU 313 delivers the ON command signal to the converter pressure selector valve 129 as in the P range stopping state. Since the selector valve 129 in the ON state, and the modifier control pressure P$_L$-SOL is slightly high, the torque converter pressure regulating valve 124 supplies the pressure of a slightly high level to the lockup control valve 126. Since the lockup control pressure P$_L$/U-SOL is zero, the lockup control valve 126 supplies the converter pressure P$_{T/C}$ to the release side chamber 12h of the torque converter 12 to maintain the non-lockup state. The fluid is recovered from the apply side chamber 12g and supplied to the lubricating systems for lubrication.

In this case, this control system lowers the torque converter pressure P$_{T/C}$ to the ON period minimum converter pressure P$_{T/CMIN}$-ON which is lower than the OFF period minimum converter pressure P$_{T/CMIN}$-OFF. As a result, this control system can lower the original line pressure P$_L$ and the required output pressure of the pump 101, and thereby curtail the energy consumption.

When, in the D range, the driver releases the brake pedal and instead depresses the accelerator pedal deeply, and a stall start begins, the engine torque T$_E$ of the step 513b increases sharply as shown in FIG. 7 with increase in the throttle opening TH and the engine speed N$_E$. With this increase in the calculated engine torque T$_E$, the calculated line pressure P$_L$ of the step 513c increases sharply toward the maximum line pressure curve L$_{MAX}$ in the state of the maximum speed ratio C$_{Hi}$, and accordingly the modifier duty ratio decreases sharply. The vehicle speed V is still lower than the lockup on speed V$_L$/U-ON, and the lockup duty ratio is held equal to zero. When the throttle opening TH exceeds the predetermined value TH$_0$, the step 608 is reached, and the CPU 313 sets the desired pulse count P$_D$ to a zero count representing the maximum speed ratio C$_{Hi}$ as shown in FIG. 6, and proceeds to the step 630. Since the current pulse count P$_A$ is still zero, and P$_A$=P$_D$, the CPU 313 proceeds directly to the step 636, and holds the stepper motor position unchanged by producing the stepper motor drive signal of a zero step number. At the step 638, the CPU produces the modifier solenoid drive signal of the rapidly decreasing modifier duty ratio, and the lockup solenoid drive signal of the lockup duty ratio still held at zero.

In the control process of FIG. 11, the CPU 313 ascertains that the lockup flag LUF is still in the reset state of zero, and takes the course of the steps S4, S9 and S10. Though the vehicle speed V has not yet reached the OFF speed $V_{OFF}$, the engine speed N increases rapidly with the depression of the accelerator pedal, and soon exceeds the OFF engine speed $N_{EOFF}$. In response to this increase of the engine speed $N_E$ beyond $N_{EOFF}$, the CPU 313 turns off the converter pressure selector valve 129 at the step S8, abiding by the judgement of the step S10.

As a result, the stepper motor 108 remains in the position of the maximum speed ratio $C_{Hi}$; the modifier duty valve 120 increases the modifier control pressure $P_{L\text{-}SOL}$ in response to the decrease of the modifier duty ratio; the pressure modifier valve 116 receives this modifier control pressure, connects the input and outlet ports 116d and 116a by moving the spool 116g upwards, and supplies the increased modifier pilot pressure $P_{L\text{-}PLT}$ to the pilot port 102c of the valve 102; and the line pressure regulating valve 102 receives this high modifier pilot pressure, produces the line pressure $P_L$ about the level of the maximum line pressure $P_{LMAX}$ on the maximum line pressure curve $L_{MAX}$ at the maximum speed ratio $C_{Hi}$, and supplies this line pressure $P_L$ to the cylinder chamber 32 of the follower pulley 26. Therefore, the follower pulley 26 applies, to the belt 24, a pushing force corresponding to the engine torque, and prevents slippage of the belt 24 relative to the pulleys 16 and 26. The clutch pressure regulating valve 122 also receives the increased modifier control pressure $P_{L\text{-}SOL}$ from the pilot port 122c, produces the clutch pressure PC about the level of the maximum clutch pressure $P_{CMAX}$ and supplies this clutch pressure to the forward clutch 40 through the D range port 104c of the manual valve 104. Therefore, the forward clutch 40 increases the engaging force and prevents slippage notwithstanding the input of the large engine torque $T_E$.

The lockup duty ratio is held at zero. Therefore, the lockup duty valve 128 holds the lockup control pressure $P_{L/U\text{-}SOL}$ at zero, and the lockup control valve 126 is held in the non-lockup state connecting the inlet port 126b with the release side outlet port 126c.

In response to the OFF command signal, the torque converter pressure selector valve 129 reduces the torque converter drive pilot pressure $P_{T/C\text{-}PLT}$ by draining this pilot pressure. The torque converter pressure regulating valve 124 receives the reduced converter drive pilot pressure $P_{T/C\text{-}PLT}$ from the pilot port 124f, and further receives the increased modifier control pressure $P_{L\text{-}SOL}$ from the pilot port 124h. Consequently, the converter pressure regulating valve 124 produces the torque converter pressure $P_{T/C}$ about the level of the maximum OFF period converter pressure $P_{T/CMAX\text{-}OFF}$ which is higher than the drag preventing minimum torque converter pressure $P_{T/C(ST)MIN}$ at the predetermined drag value $P_{L\text{-}SOL(ST)}$ of the modifier control pressure $P_{L\text{-}SOL}$. This converter pressure $P_{T/C}$ is supplied from the release side outlet port 126c of the lockup control valve 126 to the release side chamber 12h, and produces a sufficient pressure difference between the release side and apply side chambers 12h and 12g. Thus, this control system ensures a clearance between the lockup clutch facing member 12d and the converter cover 12f by creating the fluid flow therebetween, and thereby prevents the lockup drag. The vehicle can start and accelerate smoothly and rapidly with the maximum speed ratio $C_{Hi}$.

Figure 13:
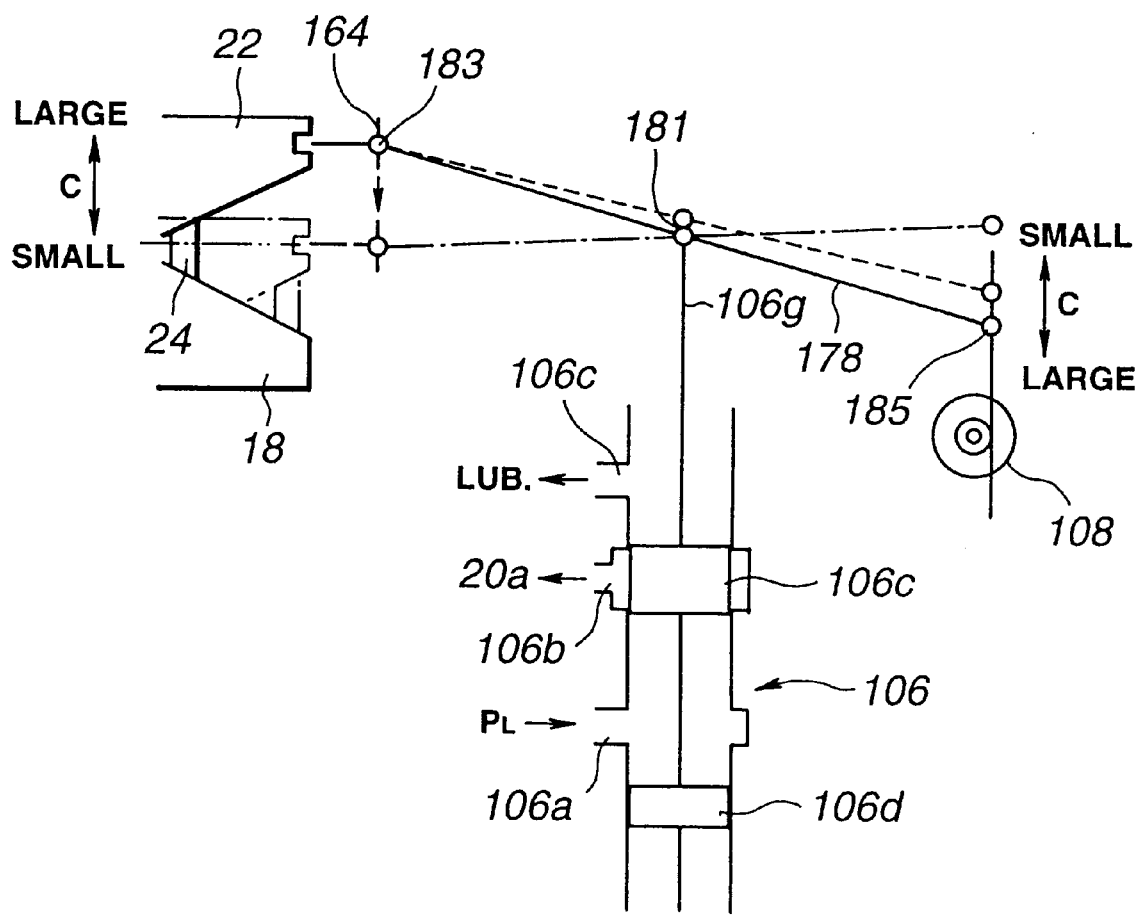
FIG. 13 is a schematic view illustrating operations of shift operating mechanism and shift control valve shown in FIG. 2.

When the vehicle is further accelerated and the vehicle speed V reaches the preset speed $V_0$, the CPU 313 takes the course of the steps 602, 624 and 626, determines the desired pulse count $P_D$ representing the desire speed ratio from the then existing values of the vehicle speed V, engine speed $N_E$, and throttle opening TH, according to the D range shift pattern, and initiates the shift control. With the pulse count $P_D$ set greater than zero, the CPU 313 takes the course of the steps 630, 632 and 634, updates the current pulse count $P_A$ by incrementing (increasing by one) the pulse count $P_A$ at the step 634, and drives the stepper motor 108 by a predetermined step angle in the counterclockwise direction in FIG. 2 by outputting the motor drive signal corresponding to the updated pulse count $P_A$ at the step 636. Then, the CPU 313 repeats this cycle until the current pulse count $P_A$ becomes equal to the desired pulse count $P_D$. As a result, the stepper motor 108 moves the pin 183 shown in FIG. 13 upwards with the translational mechanism, and rotates the lever 178 about the pin 183 in the counterclockwise direction to the position shown by a broken line. With this rotation, the lever 178 pulls up the spool 106g of the shift control valve 106 with the pin 181 to the position connecting the inlet and outlet ports 106a and 106b, and the shift control valve 106 supplies the line pressure $P_L$ through the inlet and outlet ports 106a and 106b to the cylinder chamber 20a of the driver pulley 16. With this supply of the line pressure $P_L$, the CVT mechanism 29 decreases the width of the V shaped pulley groove by moving the movable disk 22 toward the fixed disk 18, and increases the effective radius of the driver pulley 16. In response to this, the follower pulley 26 decreases its effective radius. Thus, the CVT mechanism 29 decreases the speed (reduction) ratio gradually and smoothly. With the movement of the movable disk 22, the sensor shoe 164 moves downwards, and the lever 178 rotates in the counterclockwise direction about the pin 185 of the rod 182, and pushes the spool 106g downwards, causing the land 106e to constrict the outlet port 10b gradually. When the desired speed ratio is reached, the shift control valve 106 fully closes the outlet port 10b with the land 106e, and stops the movement of the movable disk 22 by stopping the pressure increase in the driver pulley cylinder chamber 20a. In this state, the throttle opening TH is still great, and the desired speed ratio is still much larger than the minimum speed ratio $C_{DLO}$ shown in FIG. 10, and relatively close to the maximum speed ratio $C_{Hi}$.

As the speed (reduction) ratio is decreased, the calculated line pressure $P_L$ of the steps 513a~513c becomes lower even for the same engine torque $T_E$. Accordingly, the modifier duty ratio decreases gradually, and causes the modifier control pressure $P_{L\text{-}SOL}$ and the modifier pilot pressure $P_{L\text{-}PLT}$ to decrease, resulting in a slight decrease of the line pressure $P_L$. By receiving the thus-reduced line pressure $P_L$, the follower pulley 26 decreases the pressure in the cylinder chamber 32, and varies the belt gripping force to the value adapted to the speed ratio. In the control process of FIG. 11, the vehicle speed V above the ON speed $V_{ON}$ yields the ON answer of the step S10 even if the engine speed $N_E$ is higher than the OFF engine speed $N_{EOFF}$, and the CPU 313 delivers the ON command signal to the selector valve 129. In response, the selector valve 129 ceases the drainage of the converter drive pilot pressure $P_{T/C\text{-}PLT}$, and switches the torque converter pressure $P_{T/C}$ from the OFF time pressure $P_{T/C\text{-}OFF}$ to the ON time pressure $P_{T/C\text{-}ON}$ shown in FIG. 3. The torque converter pressure $P_{T/C}$ decreases gradually along the ON time converter pressure curve $P_{T/C\text{-}ON}$.

If the throttle opening TH remains at a great value, and the vehicle speed V exceeds the lockup on vehicle speed $V_{L/U\text{-}ON}$, the CPU 313 takes the course of the steps 522, 524, 526 and 528. If the $N_D$ is equal to or greater than $N_0$, the CPU 313 proceeds to the step 538, judging that the speed difference is too large, and performs the feedback control by setting the lockup duty ratio to the value corresponding to the deviation e and the feedback gain G1. With this feedback control action, the lockup duty valve 128 increases the lockup control pressure P$_L$/U-SOL gradually, and the lockup control valve 126 receives this lockup control pressure from the pilot port 126*j* and moves the spool 126*o* leftwards against the force of the return spring 126*p* to the position connecting the inlet port 126*b* with the apply side outlet port 126*d*. Thus, by gradually decreasing the supply of the torque converter pressure P$_T$/C to the release chamber 12*h* and instead increasing the supply of the torque converter pressure P$_T$/C to the apply chamber 12*g*, the lockup control valve 126 gradually shifts the torque converter 12 to the lockup state.

When the speed deviation N$_D$ becomes small than the system switching threshold value N$_0$, the CPU 313 proceeds from the step 528 to the step 530, and repeats the feedforward control of adding the predetermined value α to the lockup duty ratio until the lockup duty ratio exceeds 100%. When the lockup duty ratio becomes equal to or greater than 100%, the CPU 313 sets the lockup duty ratio to 100% at the step 5341 sets the lockup flag LUF to one, and then proceeds to the step 602. Thereafter, the CPU 313 repeats the flow of the steps 520, 544 and 546 to set the lockup duty ratio to 100% until the vehicle speed V becomes lower than the lockup off speed V$_L$/U-OFF. As a result, the lockup duty valve 128 further increases the lockup control pressure P$_L$/U-SOL, and the lockup control valve 126 fully opens the fluid passage connecting the inlet port 126*b* with the apply side outlet port 126*d* by moving the spool 120*o* further leftwards, and supplies the torque converter pressure P$_T$/C only to the apply side chamber 12*g*. The torque converter 12 is therefore put in the complete lockup state in which the lockup facing member 12*d* and the converter cover 12*f* are mechanically coupled to provide a direct mechanical drive, and the vehicle continues the accelerating operation. In this case, the release side chamber 12*h* is connected through the release side outlet port 126*c* to the drain port 126*x* so that the fluid is drained from the release side chamber 12*h*. At the same time, the lockup control valve 126 opens the passage between the lubrication inlet and outlet ports 126*f* and 126*e* and thereby allows the supply to the lubricating systems, of the output pressure on the downstream side of the torque converter pressure regulating valve 124.

Until the torque converter 12 is put in the lockup state and the lockup flag LUF is set to one, even if the throttle opening TH remains great, the control system continues decreasing the speed ratio C gradually with increase in the vehicle speed V by the control process of FIGS. 5A and 5B; decreases the line pressure P$_L$ calculated at the step 513*c* gradually with increase in the vehicle speed and with decrease in the speed ratio C, along the maximum line pressure curve P$_{LMAX}$; and gradually increases the modifier duty ratio again. Therefore, the modifier control pressure P$_L$-SOL outputted from the modifier duty valve 120 decreases gradually, and becomes lower than the lockup switching value P$_L$-SOL(L/U) shown in FIG. 3 when the torque converter 12 is put completely in the lockup state and the lockup flag is set to one. This decrease of the modifier control pressure P$_L$-SOL causes a decrease of the clutch pressure PC supplied from the valve 122 to the forward clutch 40, and a gradual decrease of the converter pressure P$_T$/C supplied from the valve 124 to the apply side chamber 12*g*, along the line of the on time torque converter pressure P$_T$/C-ON shown in FIG. 3. Since the throttle opening TH is great, the speed ratio still remains much higher than the minimum speed ratio C$_{DLO}$.

In the control process of FIG. 11, the CPU takes the flow of the steps S2, S3, S5 and S6 after the set of the lockup flag LUF to one. When the line pressure P$_L$ decreases during the accelerating operation, and becomes lower than or equal to the OFF line pressure P$_{LOFF}$, the CPU 313 output the OFF command to the converter pressure selector valve 129 at the step S8 because the engine toque T$_E$ has already become equal to or greater than the OFF engine torque T$_{EOFF}$. Since the vehicle has already entered into the high output high speed running state, and the selector valve 129 drains the torque converter driving pilot pressure P$_T$/C-PLT in response to the OFF command signal, the toque converter pressure P$_T$/C supplied from the valve 124 to the apply side chamber 12*g* is switched to a relatively high value of the OFF time converter pressure P$_T$/C-OFF shown in FIG. 3, corresponding to the then existing value of the modifier control pressure P$_L$-SOL. Along the line of the OFF time converter pressure P$_T$/C-OFF, the P$_T$/C, even though reduced to the OFF time minimum pressure P$_T$/CMIN-OFF, is held at a sufficient pressure level to develop a pressure difference required to maintain the lockup state of the torque converter 12 when supplied to the apply side chamber 12*g*. Therefore, the OFF time converter pressure P$_T$/C-OFF can maintain the torque converter lockup state in the high output running state. The OFF time maximum converter pressure P$_T$/CMAX-OFF is not greater than the withstanding pressure of the torque converter in the lockup state, so that the torque converter 12 does not suffer mechanical damage.

When the accelerator pedal remains depressed to hold the throttle opening TH and the engine speed N$_E$ constant after a desired high speed is reached, the desired pulse count P$_D$ of the step 626 becomes constant, and matches with the current pulse count P$_A$. Therefore, the CPU 313 holds the current pulse count P$_A$ unchanged by proceeding from the step 630 to the step 636, and causes the vehicle to maintain the constant speed running state without changing the speed ratio. The speed ratio C is still at a level much larger than the minimum speed ratio C$_{DLO}$. Since, in this constant speed state, the speed ratio is unchanging and the engine torque T$_E$ is also unchanging, the CPU 313 holds the line pressure P$_L$ of the step 513*c* unchanged, holds the modifier duty ratio at the previous value, and repeats the decision for the OFF command at the step S6 of FIG. 11. The converter pressure selector valve 129 remains in the OFF state, the torque converter pressure P$_T$/C is held at a high level according to the OFF time converter pressure P$_T$/C-OFF, and accordingly, the torque converter 12 is held in the lockup state even in this high output, high speed, constant speed running state. The torque converter 12 does not suffer mechanical damage in this case too.

When the accelerator pedal is released to apply the engine braking effect or the brake pedal is depressed, throttle opening TH decreases largely, the desired speed ratio C of the step 626 decreases abruptly to the minimum speed ratio C$_{DLO}$, and the desired pulse count P$_D$ increases largely. Accordingly, the CPU 313 proceeds from the step 630 to the step 632 to change the stepper motor drive signal in the upshift direction, and repeats the flow of the steps 632 and 634 to increase the current pulse count P$_A$ by one each time. The driver pulley 16 decreases the groove width and increases the effective radius gradually but greatly by receiving the ample supply of the fluid of the line pressure P$_L$ into the cylinder chamber 20*a*, and the follower pulley 26 decreases the effective radius gradually but greatly. Thus, the CVT mechanism 29 decreases the input/output speed ratio C and effects an upshift.

The large decrease of the throttle opening TH causes a decrease of the engine torque T$_E$ of the step 513*b*. Therefore, the line pressure P$_L$ of the step 513c is decreased greatly to the level of the minimum line pressure P$_{LMIN}$ at the intersection between the minimum line pressure line L$_{MIN}$ and the vertical line of the minimum speed ratio C$_{LO}$. The control system decreases the modifier pilot pressure P$_{L-SOL}$ by increasing the modifier duty ratio largely, and the modifier valve 116 decreases the modifier pilot pressure P$_{L-PLT}$. Thus, this control system makes lower all of the line pressure P$_L$ regulated by the valve 102, the clutch pressure P$_C$ regulated by the valve 122 and the converter pressure P$_{T/C}$ regulated by the valve 124.

When the engine torque T$_E$ is decreased below the ON engine torque line T$_{EON}$ of FIG. 12A or the line pressure P$_L$ becomes equal to or greater than the ON line pressure P$_{LON}$, the CPU 313 makes the decision for the ON command at the step S6, and turns on the selector valve 129 at the step S7. Since the vehicle is already out of the high output high speed running state, and enters into the state in which the throttle opening TH is small and/or the vehicle speed V is lower than the high speed range, and the selector valve 129 stops draining the converter drive pilot pressure P$_{T/C-PLT}$ in response to the ON command signal, the torque converter pressure P$_{T/C}$ is switched to a relatively low value of the ON time converter pressure P$_{T/C-ON}$ corresponding to the then existing value of the modifier control pressure P$_{L-SOL}$. The ON time converter pressure line P$_{T/C-ON}$ is lower than the OFF time converter pressure line P$_{T/C-OFF}$. This ON time converter pressure P$_{T/C-ON}$ is supplied to the apply side chamber 12g and creates a sufficient pressure difference to maintain the torque converter lockup state out of the high output, high speed state. This ON time converter pressure P$_{T/C-ON}$ prevents the before-mentioned override in the clutch pressure regulating valve 122, and thereby prevents the override in the line pressure regulating valve 102 by preventing an increase of the clutch pressure. Consequently, this control system can prevent a decrease of the fuel consumption by preventing the load on the pump from being increased by an excessive increase of the line pressure.

When the vehicle speed V is decreased to a desired medium or low speed level, and the accelerator pedal remains slightly depressed, the throttle opening TH and the engine speed N$_E$ both become constant, and the desired pulse count P$_D$ of the step 626 becomes constant and matches with the current pulse count P$_A$. The control system holds unchanged the current pulse count P$_A$ and hence the speed ratio by proceeding from the step 630 to the step 636, and the vehicle continues the constant speed operation at the medium or low vehicle speed. Provided that the speed ratio C is still held at the minimum speed ratio C$_{LO}$, the throttle opening TH is small, the engine speed N$_E$ is held low because of the relationship of the low or medium vehicle speed and the minimum speed ratio, and the engine torque T$_E$ is small, the line pressure P$_L$ of the step 513c becomes equal to the minimum pressure P$_{LMIN}$, and the modifier control pressure P$_{L-SOL}$ is lowered to the minimum value. Therefore, the control system repeats the decision for the ON command at the step S6, holds the selector valve 129 in the ON state, and holds the torque converter pressure P$_{T/C}$ at a low level according to the ON time converter pressure P$_{T/C-ON}$. Specifically, due to the setting of the modifier control pressure P$_{L-SOL}$ to the minimum, the control system can minimize the override in the clutch pressure regulating valve 122 when the converter pressure P$_{T/C}$ becomes equal to the ON time minimum pressure P$_{T/CMIN-ON}$, and further minimize the override in the line pressure regulating valve 102 by preventing an increase of the clutch pressure P$_C$. Consequently, this control system can prevent a decrease of the fuel consumption by preventing the load on the pump from being increased by an excessive increase of the line pressure.

If the vehicle decelerating state continues and the vehicle speed V becomes lower than the lockup off speed V$_{L/U-OFF}$, the control system sets the lockup duty ratio to zero at the step 540 and resets the lockup flag LUF to zero at the step 542. This control action decreases the lockup control pressure P$_{L/U-SOL}$ and causes the lockup control valve 126 to instantaneously move the spool 126o rightwards to the position for supplying the converter pressure P$_{T/C}$ to the release side chamber 12h, and the torque converter 12 immediately returns from the lockup state to the non-lockup state to provide a hydrodynamic drive. During this, the speed ratio C is held at the minimum ratio C$_{DLO}$ until the vehicle speed V becomes equal to a predetermined speed value V$_{D1}$. After the vehicle speed V becomes equal to or lower V$_{D1}$, the speed ratio C is increased toward the maximum ratio C$_{Hi}$ along a shift control line of a minimum value TH1 of the throttle opening TH. Taking the flow of the steps 626, 630, 620 and 622, the control system rotates the stepper motor 108 in the downshift direction, and decrements the current pulse count P$_A$. The stepper motor 108 rotates in the clockwise direction and increases the speed ratio C of the CVT mechanism 29. When the vehicle sped V becomes lower than the preset speed V$_0$, the control system proceeds from the step 602 to the step 604, further proceeds to the step 610 because of the throttle opening TH being smaller than TH$_0$, rotates the stepper motor 108 in the downshift direction and decrements the current pulse count P$_A$ until P$_A$ is reduced to zero corresponding to the maximum ratio C$_{Hi}$. When P$_A$ is reduced to zero, the control system only updates P$_A$ to zero at the step 618 and holds the speed ratio of the CVT mechanism 29 at the maximum ratio C$_{Hi}$. In this case, the lockup flag LUF is in the zero reset state, and the vehicle speed V is equal to or higher than the ON vehicle speed V$_{ON}$ or the engine speed NE is equal to or lower than the ON engine speed N$_{EON}$. Therefore, the converter pressure selector valve 129 is held in the on state, and the torque converter pressure P$_{T/C}$ increases gradually with increase in the speed ratio C, along the ON time converter pressure P$_{T/C-ON}$.

When the vehicle comes to a stop, and the select lever is shifted from the D range to the N range, the spool 104i moves downwards in the manual valve 104 to the position for draining the D range port 104c, and the fluid drains from the fluid chamber of the forward clutch 40 to the D range port 104c through the restriction 142b due to the interposition of the check valve 142o, so that the clutch pressure in the forward clutch 40 decreases in such a gradual manner as to prevent a shift shock from D to N.

When the select lever is shifted to the R range, the manual valve 104 connects the inlet port 104a and the R range port 104b, and supplies the clutch pressure PC regulated by the valve 122 to the reverse brake 50. The reverse brake 50 engages, and reverses the rotational direction of the drive shaft 14, and the vehicle moves backwards. The control system controls the speed ratio by controlling the stepper motor 108 and the shift control valve 106 according to the R range shift pattern of the step 640.

In one interpretation of this embodiment, the step S2 corresponds to lockup monitoring means for monitoring a lockup indicative operating parameter (such as LUF, L/U DUTY, P$_{L/U-SOL}$ or P$_L$). The steps S6~S8 and S10, and the selector valve 129 correspond to means for adjusting the torque converter pressure. The step S3, 508, 512, 513a~513c, and the components 300, 301 and 303 correspond to input load monitoring means for monitoring an input load indicative operating parameter such as $T_E$ or $P_L$. The step S6 corresponds to lockup time adjusting means. The steps S4 and S9 and the components 300, 301 and 302 correspond to means for monitoring a stall start indicative operating parameter such as $N_E$ or V. The step S10 corresponds to non-lockup time adjusting means.

Figures 14A, 14B:
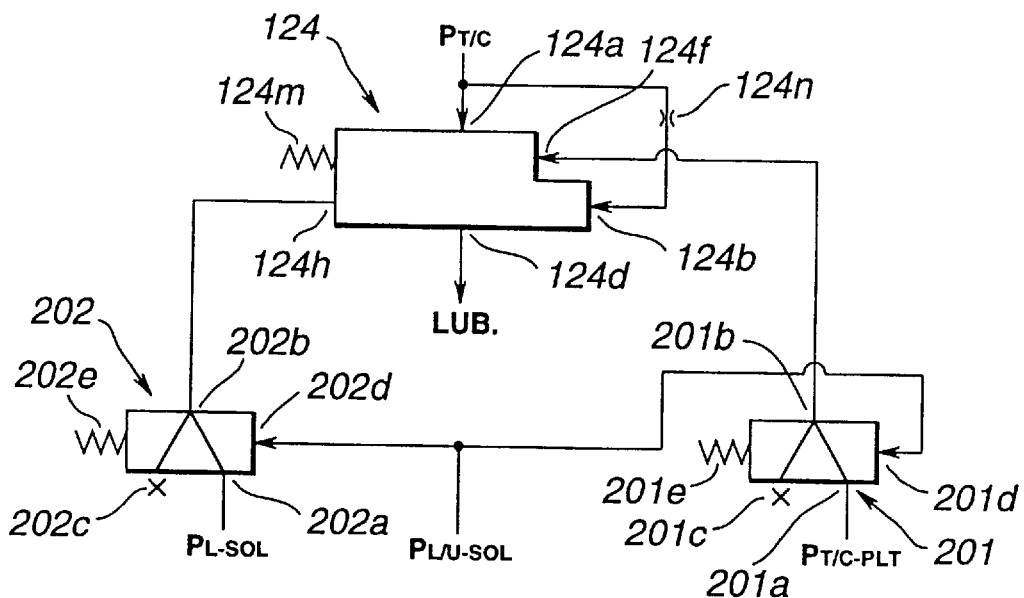
FIG. 14A is a sequence view of a fluid pressure circuit including a torque converter pressure regulating valve according to another embodiment of the present invention.
FIG. 14B is a table illustrating operations of selector valves of FIG. 14A.
Figure 15:
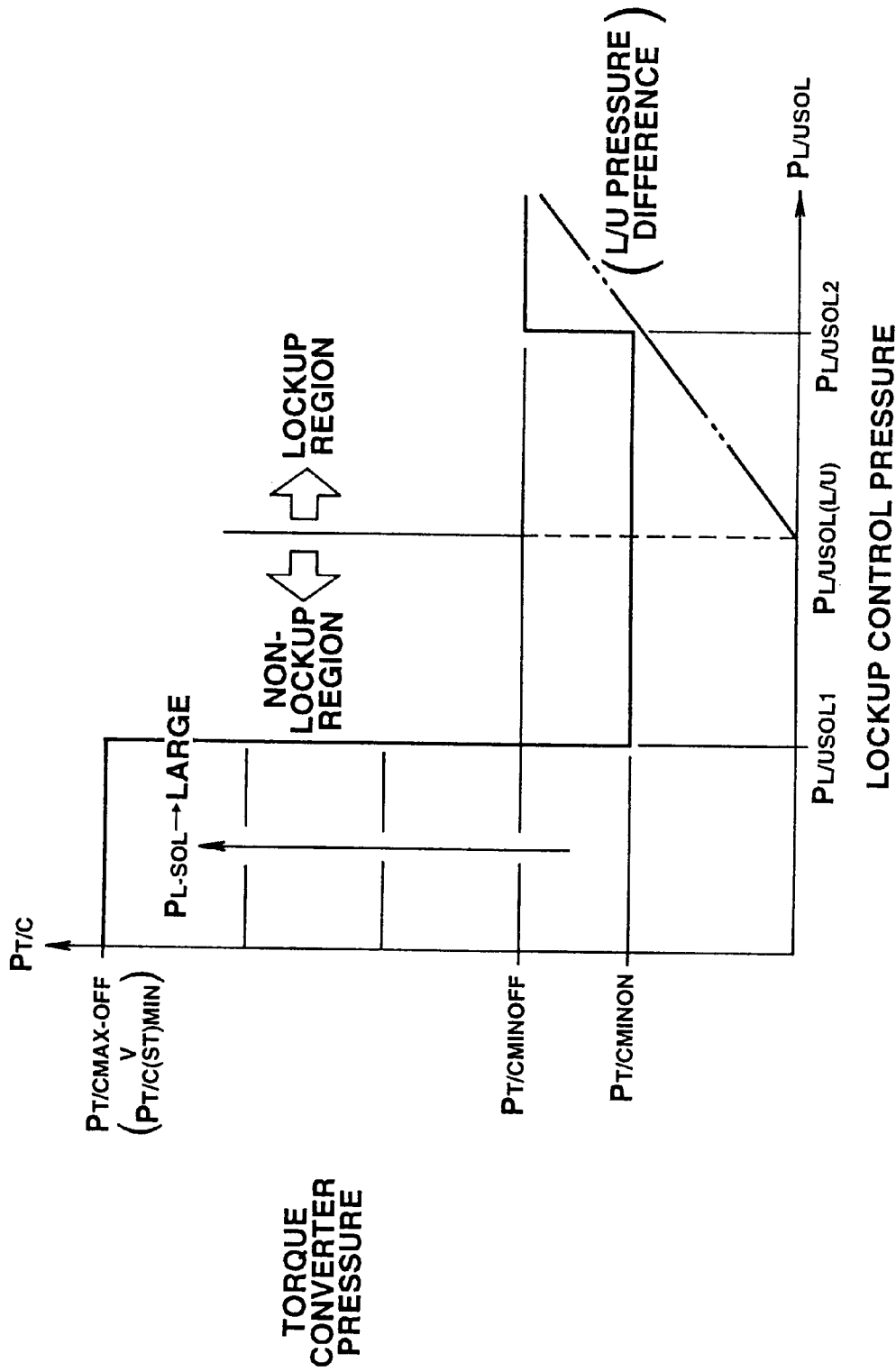
FIG. 15 is a graph showing a characteristic of the torque converter pressure controlled by the circuit of FIGS. 14A and 14B.
Figure 16:
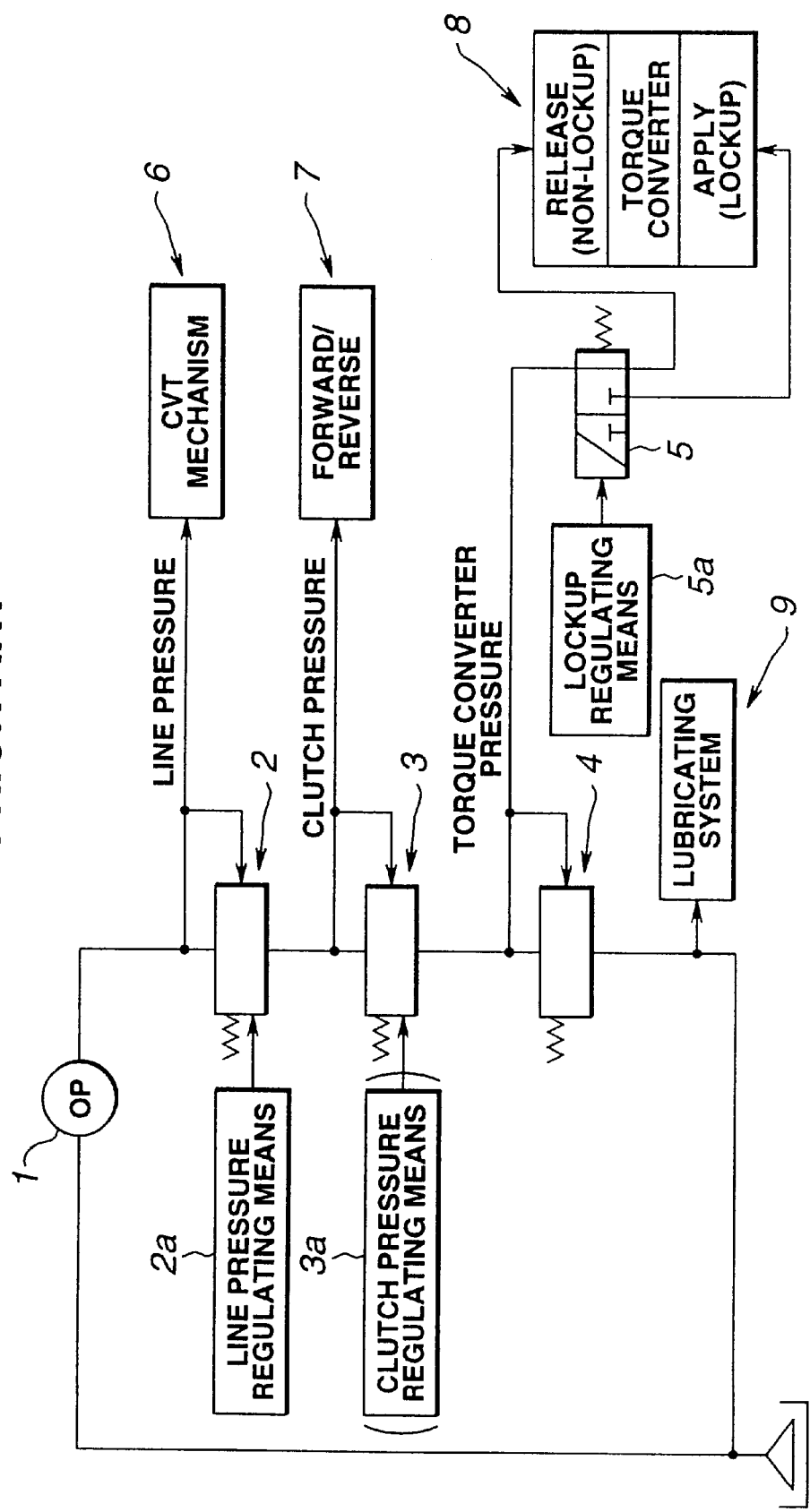
FIG. 16 is a schematic view showing a conventional arrangement of pressure regulating valves for a CVT system.
Figure 17A:
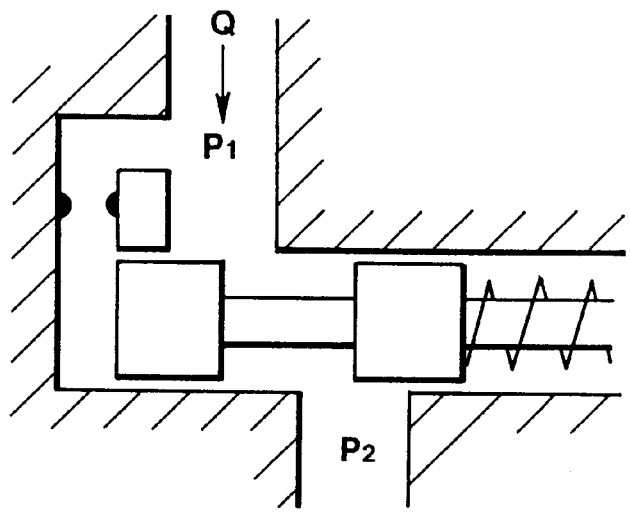
FIG. 17A is a sectional view of one of the regulating valves of FIG. 16.
Figure 17B:
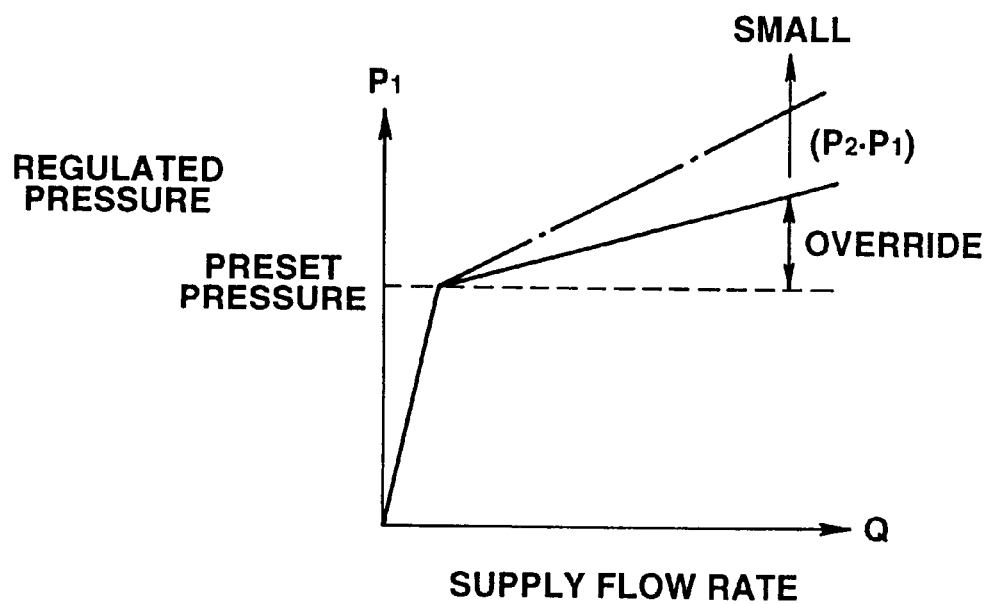
FIG. 17B is a graph of a characteristic of the valve of FIG. 17A for illustrating override.

FIGS. 14A, 14B and 15 shows a belt type CVT control system according to a second embodiment of the present invention.

The torque converter pressure selector valve 129 of the first embodiment is a valve actuated by a solenoid. The solenoid valve increases the cost, and incurs a problem in layout because the valve is unsuitable for incorporation into a so-called valve unit and need be placed separately. To avoid these problems of the solenoid type selector valve 129, the second embodiment employs another valve system.

FIG. 14A shows, in a simplified manner, the torque converter pressure regulating valve 124 and its surroundings in the form of a sequence view. Though the plug 124r and the drain ports are omitted, the converter pressure regulating valve 124 of FIG. 14A is equivalent to the counterpart of FIG. 2. That is, the torque converter drive pilot pressure $P_{T/C-PLT}$ of the constant pressure regulating valve 118 acts on the pressure decreasing side from the pilot port 124f, and the modifier control pressure $P_{L-SOL}$ of the modifier duty valve 120 acts on the pressure increasing side from the pilot port 124h. In the second embodiment, however, there are provided a pressure decreasing side selector valve 201 in the fluid pressure line for supplying the converter drive pilot pressure $P_{T/C-PLT}$, and a pressure increasing side selector valve 202 in the fluid pressure line for supplying the modifier control valve $P_{L-SOL}$. Each of these selector valves 201 and 202 is a pilot-actuated valve receiving the lockup control pressure $P_{L/U-SOL}$ from the lockup duty valve 128 as a pilot pressure. The selector valves 201 and 202 are opened and closed in dependence on the lockup control pressure $P_{L/U-SOL}$ as shown in FIG. 14B.

The pressure increasing side selector valve 202 has an inlet port 202a connected with the outlet port 120b of the modifier duty valve 120, an outlet port 202b connected with the pilot port 124h of the converter pressure regulating valve 124, a drain port 202c, a return spring 202e for urging a spool of the valve 202, and a pilot port 202d opposed to the return spring 202e across the spool. The pilot port 202d is connected with the outlet port 128d of the lockup duty valve 128. When the lockup control pressure $P_{L/U-SOL}$ is in a range from zero to a predetermined first value $P_{L/U-SOL}1$, the increasing side selector valve 202 is in the open state in which, by the force of the return spring 202e, the inlet and outlet ports 202a and 202b are connected together, and the modifier control pressure $P_{L-SOL}$ is supplied to the pilot port 124h of the converter pressure regulator valve 124. When the lockup control pressure $P_{L/U-SOL}$ is equal to or higher than the predetermined first value $P_{L/U-SOL}1$, the increasing side selector valve 202 is in the closed state in which the inlet and outlet ports 202a and 202b are shut off, and the modifier control pressure $P_{L-SOL}$ is drained through the drain port 202c. The predetermined first value $P_{L/U-SOL}1$ is lower than the lockup switching value $P_{L-SOL(L/U)}$ shown in FIG. 3.

The pressure decreasing side selector valve 201 has an inlet port 201a connected with the outlet port 118b of the constant pressure regulating valve 118 through the restriction 124g, an outlet port 201b connected with the pilot port 124f of the converter pressure regulating valve 124, a drain port 201c, a spool, a return spring 201e for urging the spool of the valve 201, and a pilot port 201d opposed to the return spring 201e across the spool. The pilot port 201d is connected with the outlet port 128d of the lockup duty valve 128. When the lockup control pressure $P_{L/U-SOL}$ is in a range from zero to a predetermined second value $P_{L/U-SOL}2$, the decreasing side selector valve 201 is in the open state in which, by the force of the return spring 201e, the inlet and outlet ports 201a and 201b are connected together, and the converter drive pilot pressure $P_{T/C-PLT}$ is supplied to the pilot port 124f of the converter pressure regulator valve 124. When the lockup control pressure $P_{L/U-SOL}$ is equal to or higher than the predetermined second value $P_{L/U-SOL}2$, the decreasing side selector valve 201 is in the closed state in which the input and outlet ports 201a and 201b are shut off, and the converter drive pilot pressure $P_{T/C-PLT}$ is drained through the drain port 201c. The predetermined second value $P_{L/U-SOL}2$ is higher than the lockup switching value $P_{L-SOL(L/U)}$ shown in FIG. 3.

This hydraulic circuit controls the torque converter pressure $P_{T/C}$ in accordance with the lockup control pressure $P_{L/U-SOL}$ as shown in FIG. 15.

In the range of the lockup control pressure $P_{L/U-SOL}$ from zero to the first value $P_{L/U-SOL}1$, the selector valves 201 and 202 are both in the open state, and the converter pressure regulating valve 124 receives the pilot pressure formed from the converter pressure $P_{T/C}$ through the restriction 124n and the converter drive pilot pressure $P_{T/C-PLT}$ on the pressure decreasing side, and the modifier control pressure $P_{L-SOL}$ on the pressure increasing side. Considering that the converter pressure $P_{T/C}$ at the zero level of the modifier control pressure $P_{L-SOL}$ is equal to the ON time minimum converter pressure $P_{T/CMIN-ON}$, the hydraulic circuit increases the torque converter pressure $P_{T/C}$ with increase in the modifier control pressure $P_{L-SOL}$ in this pressure range of the lockup control pressure $P_{L/U-SOL}$ in which the torque converter 12 in the non-lockup state. The converter pressure $P_{T/C}$ at the maximum value of the modifier control pressure $P_{L-SOL}$ is set approximately equal to the OFF time maximum converter pressure $P_{T/CMAX-OFF}$ which is higher than the drag preventive minimum converter pressure $P_{T/C(ST)MIN}$ shown in FIG. 3, by adjusting the pressure receiving area of the spool of the converter pressure regulating valve 124 for receiving the modifier control pressure $P_{L-SOL}$. The line pressure at which a lockup drag occurs in the stall start operation is dependent on the modifier control pressure $P_{L-SOL}$. The modifier control pressure $P_{L-SOL}$ is dependent on the engine torque $T_E$ and the speed (reduction) ratio C. The engine torque $T_E$ is dependent on the engine speed $N_E$ and the throttle opening TH, and the speed ratio C is dependent on the throttle opening TH and the vehicle speed V. In the stall start operation, therefore, the control system can determine the modifier control pressure $P_{L-SOL}$ in accordance with $N_E$ and V, increase the modifier control pressure $P_{L-SOL}$ along the maximum line pressure line $L_{MIN}$, and makes the converter pressure $P_{T/C}$ higher than the drag preventive minimum pressure $P_{T/C(ST)MIN}$ as in the first embodiment. By so doing, the control system can prevent the lockup drag by building a sufficient pressure difference between the release and apply side chambers 12h and 12g.

In the range of the lockup control pressure $P_{L/U-SOL}$ between the first and second values $P_{L/U-SOL}1$ and $P_{L/U-SOL}2$, the pressure increasing side selector valve 202 is in the closed state, and the pressure decreasing side selector valve 201 is in the open state. The converter pressure regulating valve 124 receives the pilot pressure formed from the converter pressure $P_{T/C}$, and the converter drive pilot pressure P<small>T/C-PLT</small> on the pressure decreasing side, but the supply of the modifier control pressure P<small>L-SOL</small> to the pressure increasing side is cut off. In this range, therefore, this control system holds the converter pressure P<small>T/C</small> about the level of the ON time minimum converter pressure P<small>T/CMIN-ON</small>. If the lockup control pressure P<small>L/U-SOL</small> exceeds the lockup switch value P<small>L-SOL(L/U)</small>, the torque converter 12 is put in the lockup state.

In the range of the lockup control pressure P<small>L/U-SOL</small> higher than or equal to the second pressure level P<small>L/U-SOL</small>2, the selector valves 201 and 202 are both in the closed state. The converter pressure regulating valve 124 receives only the pilot pressure formed from the converter pressure P<small>T/C</small> on the pressure decreasing side, and the selector valves 201 and 202 cut off the supply of the converter drive pilot pressure P<small>T/C-PLT</small> and the modifier control pressure P<small>L-SOL</small>. In this range, therefore, the torque converter pressure P<small>T/C</small> is held at a constant pressure value higher than the ON time minimum converter pressure P<small>T/CMIN-ON</small>.

In FIG. 15, a two-dot chain line represents a lockup (L/U) pressure difference required to produce a lockup engaging force to maintain the lockup state of the torque converter 12. In the lockup region above P<small>L/U-SOL(L/U)</small>, the lockup control pressure P<small>L/U-SOL</small> is increased with increase of the rotating condition of the torque converter 12 (the speed deviation N<small>D</small> of the engine speed N<small>E</small> from the turbine speed Nt, to be exact). As the lockup control pressure P<small>L/U-SOL</small> increases, the torque converter 12 must increase the lockup engaging force to prevent slippage between the lockup facing member 12d and the converter cover 12f by increasing the pressure difference between the apply and release side chambers 12g and 12h. Since the release side chamber 12h is drained in the lockup state, the pressure difference required to maintain the lockup state is represented by the torque converter pressure P<small>T/C</small> supplied to the apply side chamber 12g. The two-dot chain line in FIG. 15 shows the required lockup pressure difference in terms of the torque converter pressure P<small>T/C</small>.

In the second embodiment, when the lockup control pressure P<small>L/U-SOL</small> exceeds the second value P<small>L/U-SOL</small>2, the torque converter pressure P<small>T/C</small> is switched to the higher level approximately equal to the OFF time minimum converter pressure P<small>T/CMIN-OFF</small> in order to supply the apply chamber 12g with the converter pressure P<small>T/C</small> of a high enough level to ensure the lockup pressure difference. Specifically, in the high output high speed operation, in response to the lockup control pressure P<small>L/U-SOL</small> set higher than the second value P<small>L/U-SOL</small>2, the control system makes the converter pressure P<small>T/C</small> high enough to maintain the lockup state exempt from slippage with a sufficient lockup pressure difference. In this example, the lockup region is divided into first and second sub-regions separated by the second pressure value P<small>L/U-SOL</small>2. The torque converter pressure P<small>T/C</small> is set to the level of the ON time minimum converter pressure P<small>T/CMIN-ON</small> in the first subregion below P<small>L/U-SOL</small>2, whereas, in the second subregion above P<small>L/U-SOL</small>2, the pressure level is the OFF time minimum converter pressure P<small>T/CMIN-OFF</small>. The first subregion is widened, as long as the setting of the converter pressure is above the two-dot chain line of the lockup pressure difference, by setting the second value P<small>L/U-SOL</small>2 as high as possible. By lowering the setting of the converter pressure P<small>T/C</small> in the first subregion in which the vehicle is out of the high output high speed state, and the required lockup difference is low, this control system can prevent override in the clutch pressure regulating valve 122 and the line pressure regulating valve 102 more effectively, and improve the fuel economy by lessening the load on the pump 101.

In the first embodiment, the control system detects the lockup state of the torque converter by setting the lockup flag when the lockup duty ratio becomes equal to 100% corresponding to the complete lockup condition. However, it is possible to detect or estimate the lockup state in various other ways. For example, the control system can detect or assume the existence of the lockup state by monitoring one or more of the line pressure, the modifier pilot pressure, the modifier control pressure and the modifier duty ratio specifically when the control system is arranged to control the line pressure above a predetermined level in the non-lockup state, and below the level in the lockup state.

In the illustrated embodiments of the invention, the clutch pressure regulating valve 122 is interposed between the line pressure regulating valve 102 and the converter pressure regulating valve 124. However, the present invention is possible in the hydraulic circuit in which the clutch pressure regulating valve 122 is omitted.

In the illustrated embodiments, the shift control unit 300 includes a microcomputer as a main component. However, the shift control unit may be in the form of a combination of electronic circuits instead of the microcomputer.

The second embodiment employs, as a control signal to the selector valves 201 and 202, the lockup control pressure P<small>L/U-SOL</small> which is increased gradually from the non-lockup state to the lockup state, and each of the non-lockup operating region and the lockup operating region is divided into lower and upper subregions by the first value P<small>L/U-SOL</small>1 or the second value P<small>L/U-SOL</small>2, as shown in FIG. 15. In the lower non-lockup subregion below the first pressure value, both selector valves 201 and 202 are open, and the control pressure (P<small>L-SOL</small>) on the increasing side of the regulator valve 124 is increased in the stall start operating state in which the engine speed is relatively high and the throttle is wide open, that is, the engine output torque is great and the CVT reduction ratio is high. Therefore, the converter pressure regulating valve 124 can prevent the lockup drag in the stall start operation by increasing the converter pressure to a level equal to or higher than the withstanding pressure of the torque converter. In the upper lockup subregion above the second value P<small>L/U-SOL</small>2, the control system can secure the lockup state in the high output high speed operation by increasing the converter pressure. In the upper non-lockup subregion and lower lockup subregion between the first and second values, the control system decreases the torque converter pressure to a lower level to reduce the energy loss and to restrain the overdrive.

The before-mentioned Japanese Patent Publication No. 7-259941 and the U.S. Pat. No. 5,607,373 provide explanation and illustration facilitating understanding the underlying features of the present invention. These are hereby incorporated by reference.

What is claimed is:

1. A control system comprising:
   a lockup torque converter;
   a continuously variable transmission mechanism comprising a driver pulley, a follower pulley and a belt connecting the pulleys;
   a fluid pump;
   a first pressure regulating valve for receiving a fluid under pressure from the pump, producing a first regulated fluid pressure depending on an input load on the transmission mechanism and supplying the first regulated fluid pressure to the transmission mechanism;
   a second pressure regulating valve for receiving the fluid from the first pressure regulating valve and supplying a second regulated fluid pressure to the torque converter;

lockup monitoring means for monitoring a lockup indicative operating parameter indicative of a lockup state of the torque converter to determine whether the torque converter is in the lockup state;

converter pressure adjusting means for adjusting the second regulated fluid pressure in a first regulating mode when the torque converter is in the lockup state, and in a second regulating mode when the torque converter is out of the lockup state; and input load monitoring means for monitoring an input load indicative operating parameter indicative of the input load to the transmission mechanism, and wherein the converter pressure adjusting means comprises lockup time adjusting means for increasing the second regulated fluid pressure supplied to the torque converter with increase in the input load when the torque converter is in the lockup state.

2. A control system according to claim 1 wherein the system further comprises:

a lockup control valve for putting the torque converter in the lockup state when a lockup control pressure is equal to or higher than a predetermined lockup pressure value and in a non-lockup state when the lockup control pressure is lower than the predetermined lockup pressure value;

a lockup solenoid valve for producing the lockup control pressure;

a modifier solenoid valve for producing a control pilot pressure for the first pressure regulating valve in accordance with the input load to the transmission mechanism;

a pressure increasing side selector valve which is actuated by the lockup control pressure, and held in an open position to allow supply of the control pilot pressure to a pressure increasing side of the second pressure regulating valve when the lockup control pressure is lower than a first pressure value lower than the predetermined lockup pressure value and in a closed position to prevent the supply of the control pilot pressure to the pressure increasing side of the second pressure regulating valve when the lockup control pressure is higher than the first pressure value; and a pressure decreasing side selector valve which is actuated by the lockup control pressure, and held in an open position to allow supply of a drive pilot pressure to a pressure decreasing side of the second pressure regulating valve when the lockup control pressure is lower than a second pressure value higher than the predetermined lockup pressure value and in a closed position to prevent the supply of the drive pilot pressure to the pressure decreasing side of the second pressure regulating valve when the lockup control pressure is higher than the second pressure value.

3. A control system according to claim 1 wherein the control system further comprises stall start monitoring means for monitoring a stall start indicative parameter indicative of a stall start state of a vehicle to determine whether the vehicle is in the stall start state, and the converter pressure adjusting means comprises non-lockup time adjusting means for making the second regulated fluid pressure lower when the vehicle is out of the stall start state with the torque converter being out of the lockup state than when the vehicle is in the stall start state with the torque converter being out of the lockup state.

4. A control system according to claim 1 wherein the second pressure regulating valve is a pilot actuated valve comprising a first pilot port for receiving a first pilot pressure, a movable valve element for varying the second regulated fluid pressure dependent on the first pilot pressure, a return spring for determining a fluid pressure regulating characteristic of the second regulated fluid pressure produced by the second pressure regulating valve with respect to the first pilot pressure and a second pilot port for receiving a second pilot pressure and adjusting the pressure regulating characteristic by applying the second pilot pressure on the valve element, and wherein the converter pressure adjusting means comprises a selector valve for changing the second pilot pressure supplied to the second pilot port of the second pressure regulating valve between a high pressure level and a low pressure level, lower than the high pressure level, to adjust the pressure regulating characteristic of the second pressure regulating valve.

5. A control system according to claim 1 wherein the input load monitoring means comprises an engine condition sensor for sensing an engine operating condition of an engine connected with the torque converter, and determines the input load indicative parameter in accordance with the engine operating condition.

6. A control system according to claim 5 wherein the control system further comprises stall start monitoring means for monitoring input and output speeds of the torque converter, and discriminating a stall start state of a vehicle on which the control system is mounted when the input speed is higher than a predetermined input value and the output speed is lower than a predetermined output value, and the converter pressure adjusting means comprises non-lockup time adjusting means for increasing the second regulated fluid pressure when the vehicle is in the stall start state with the torque converter being out of the lockup state.

7. A control system comprising:

a lockup torque converter;

a continuously variable transmission mechanism comprising a driver pulley, a follower pulley and a belt connecting the pulleys;

a fluid pump;

a first pressure regulating valve for receiving a fluid under pressure from the pump and supplying a first regulated fluid pressure to the transmission mechanism; and a second pressure regulating valve for receiving the fluid from the first pressure regulating valve and supplying a second regulated fluid pressure to the torque converter, the second pressure regulating valve receiving a second regulator control pressure, and increasing the second regulated fluid pressure in accordance with the second regulator control pressure, wherein the second pressure regulating valve is a pilot actuated valve and comprises an upstream port for receiving the fluid from the first pressure regulating valve and producing the second regulated fluid pressure at the upstream port, a downstream port for discharging the fluid, a pressure increasing side pilot port to which the second regulator control pressure is supplied, and a valve element for receiving the second regulator control pressure in a direction for increasing the second regulated fluid pressure, and wherein the second pressure regulating valve further comprises a pressure decreasing side pilot port for receiving a pressure decreasing side pilot pressure and applying the pressure decreasing side pilot pressure on the valve element in a direction for decreasing the second regulated fluid pressure, and the control system further comprises a pressure decreasing side selector valve comprising a first selector state for allowing supply of the decreasing side pilot pressure to the pressure decreasing side pilot port of the second pressure regulating valve and a second selector state for preventing the supply of the decreasing side pilot pressure to the pressure decreasing side pilot port of the second pressure regulating valve.

8. A control system according to claim 2 wherein the control system further comprises:

a lockup control valve for controlling a lockup condition of the torque converter in dependence on a lockup control pressure;

a lockup solenoid valve for producing the lockup control pressure;

a pilot control hydraulic circuit section for producing a first regulator control pressure and the second regulator control pressure in response to a control signal produced in accordance with an input torque to the torque converter, supplying the first regulator control pressure to the first pressure regulating valve to vary the first regulated fluid pressure in accordance with the first regulator control pressure and supplying the second regulator control pressure to the second pressure regulating valve to vary the second regulated fluid pressure in accordance with the second regulator control pressure; and a pressure increasing side selector valve which is actuated by the lockup control pressure to an open position to allow supply of the second regulator control pressure to a pressure increasing side of the second pressure regulating valve when the lockup control pressure is in a range for putting the torque converter out of a lockup state;

wherein the pressure decreasing side selector valve is actuated by the lockup control pressure to an open position to allow supply of a drive pilot pressure to a pressure decreasing side of the second pressure regulating valve when the lockup control pressure is in a range for putting the torque converter in the lockup state.

9. A control system comprising:

a drive system comprising an engine, a lockup torque converter and a belt CVT mechanism for varying a speed ratio continuously; and a hydraulic system comprising a fluid pump, a first hydraulic circuit section for producing a first regulate fluid pressure by receiving a fluid under pressure from the pump, and supplying the first regulated fluid pressure to the belt CVT mechanism, and a second hydraulic circuit section for producing a second regulated fluid pressure by receiving the fluid under pressure from the first hydraulic circuit section, and supplying the second regulated fluid pressure to the torque converter, the second hydraulic circuit section varying the second regulated fluid pressure in accordance with a second pressure control parameter and changing a second pressure regulating characteristic of the second hydraulic circuit section between first and second regulating modes, the second pressure regulating characteristic being a relationship of the second regulated fluid pressure produced by the second hydraulic circuit section with respect to the second pressure control parameter, wherein the second hydraulic circuit section comprises a second pressure regulating valve comprising a first pilot port for receiving the second pressure control parameter which is a second pressure control pilot pressure, and a valve element for increasing the second regulated fluid pressure in accordance with the second pressure control pilot pressure, and a selecting component for switching the second pressure regulating valve between a first regulator state for producing the second regulated fluid pressure in the first regulating mode, and a second regulator state for producing the second regulated fluid pressure in the second regulating mode, and wherein the second pressure regulating valve further comprises a second pilot port for receiving an adjusting pilot pressure and applying the adjusting pilot pressure on the valve element in a direction for decreasing the second regulated fluid pressure, and the selecting component is a pressure decreasing side selector valve for holding the adjusting pilot pressure at the second pilot port selectively at one of a high level and a low level.

10. The control system according to claim 9 wherein the first hydraulic circuit selection comprises a first pressure regulating valve for producing the first regulated fluid pressure supplied to the belt CVT mechanism in accordance with a first pressure control pilot pressure, wherein the hydraulic system comprises a pilot pressure producing hydraulic circuit section for producing the first pressure control pilot pressure, and the second pressure control pilot pressure in accordance with a pilot control signal, and for further producing a drive pressure, and wherein the pressure decreasing side selector valve comprises a first selector state for allowing supply of the drive pressure to the second pilot port of the second pressure regulating valve and a second selector state for preventing the supply of the drive pressure to the second pilot port of the second pressure regulating valve by draining the drive pressure, wherein the lockup torque converter comprises an apply side fluid chamber and a release side fluid chamber, and the lockup torque converter is put in a lockup state providing a direct mechanical drive when the second regulated fluid pressure is supplied to the apply side chamber and in a non-lockup state when the second regulated fluid pressure is supplied to the release side chamber, and wherein the second hydraulic circuit section further comprises a lockup control valve for supplying the second regulated fluid pressure to the apply side chamber of the torque converter when a lockup control pilot pressure is in a lockup pressure region, and for supplying the second regulated fluid pressure to the release side chamber when the lockup control pilot pressure is in a non-lockup pressure region, and a lockup solenoid valve for producing the lockup control pilot pressure in accordance with a lockup control signal.

11. The control system according to claim 10 wherein the pressure decreasing side selector valve is a solenoid valve switched between the first and second selector states in response to a selector control signal, and the control system further comprises a sensor section for sensing operating conditions of the drive system and a controller section for controlling the first regulated fluid pressure by producing the pilot control signal in accordance with the operating conditions, and controlling the second regulated fluid pressure by producing a pilot control pressure and the selector control signal in accordance with the operating conditions.

12. The control system according to claim 11 wherein the controller section determines a first parameter indicative of an input torque to the CVT mechanism, and a second parameter from the operating conditions sensed by the sensor section, and switching the pressure decreasing side selector valve between the first and second selector states in accordance with the first parameter when the torque converter is in the lockup state and in accordance with the second parameter when the torque converter is in the non-lockup state.

13. The control system according to claim 12 wherein the controller section determines the second parameter indicative of an engine speed of the engine, and a third parameter indicative of a vehicle speed of a vehicle driven by the drive system, switches the pressure decreasing side selector valve from the first selector state to the second selector state to increase the second regulated fluid pressure if the first parameter is greater than a first threshold when the torque converter is in the lockup state, and switches the pressure decreasing side selector valve from the first selector state to the second selector state to increase the second regulated fluid pressure if the second parameter is greater than a second threshold and the third parameter is lower than a third threshold when the torque converter is in the non-lockup state.

14. A control system according to claim 10 wherein the second hydraulic circuit section further comprises a pressure increasing side selector valve for selectively allowing and preventing supply of the second pressure control pilot pressure to the first pilot port of the second pressure regulating valve.

15. A control system comprising:
   a drive system comprising an engine, a lockup torque converter and a belt CVT mechanism for varying a speed ratio continuously; and
   a hydraulic system comprising a fluid pump, a first hydraulic circuit section for producing a first regulated fluid pressure by receiving a fluid under pressure from the pump, and supplying the first regulated fluid pressure to the belt CVT mechanism, and a second hydraulic circuit section for producing a second regulated fluid pressure by receiving the fluid under pressure from the first hydraulic circuit section, and supplying the second regulated fluid pressure to the torque converter, the second hydraulic circuit section varying the second regulated fluid pressure in accordance with a second pressure control parameter and changing a second pressure regulating characteristic of the second hydraulic circuit section between first and second regulating modes, the second pressure regulating characteristic being a relationship of the second regulated fluid pressure produced by the second hydraulic circuit section with respect to the second pressure control parameter,
wherein the control system comprises
   a sensor section for sensing operating conditions of the drive system; and
   a controller section for detecting a high output torque start operation of a vehicle driven by the drive system and a high output torque high speed operation of the vehicle by monitoring the operating conditions sensed by the sensor section, and adjusts the second pressure regulating characteristic of the second hydraulic circuit section to the second regulating mode to increase the second regulated fluid pressure when the torque converter is out of a lockup state for providing a direct mechanical drive and the high output torque start operation is detected, and adjusts the second pressure regulating characteristic of the second hydraulic circuit section to the second regulating mode to increase the second regulated fluid pressure when the torque converter is in the lockup state and the high output torque high speed operation is detected.

* * * * *